(12) United States Patent
Cho et al.

(10) Patent No.: US 10,284,307 B2
(45) Date of Patent: May 7, 2019

(54) RADIO FREQUENCY INTERCONNECT INCLUDING CALIBRATION SYSTEM AND METHOD OF USING

(71) Applicant: TAIWAN SEMICONDUCTOR MANUFACTURING COMPANY, LTD., Hsinchu (TW)

(72) Inventors: Lan-Chou Cho, Hsinchu (TW); William Wu Shen, Hsinchu (TW); Feng Wei Kuo, Zhudong Township (TW); Huan-Neng Chen, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/983,770

(22) Filed: Dec. 30, 2015

(65) Prior Publication Data

US 2017/0195068 A1 Jul. 6, 2017

(51) Int. Cl.
*H04B 17/13* (2015.01)
*H04L 27/00* (2006.01)

(52) U.S. Cl.
CPC ......... *H04B 17/13* (2015.01); *H04L 27/0002* (2013.01); *H04L 27/0014* (2013.01); *H04L 2027/002* (2013.01)

(58) Field of Classification Search
None
See application file for complete search history.

(56) References Cited

U.S. PATENT DOCUMENTS

| | | | |
|---|---|---|---|
| 7,203,245 B1* | 4/2007 | Murphy | H04L 1/0047 375/219 |
| 8,279,008 B2 | 10/2012 | Hsieh et al. | |
| 8,427,240 B2 | 4/2013 | Hsieh et al. | |
| 8,593,206 B2 | 11/2013 | Chen et al. | |
| 8,610,494 B1 | 12/2013 | Jin et al. | |
| 8,618,631 B2 | 12/2013 | Jin et al. | |
| 2006/0274843 A1* | 12/2006 | Koo | H04J 13/14 375/260 |
| 2011/0053646 A1* | 3/2011 | Kundmann | H01Q 3/267 455/562.1 |
| 2012/0092230 A1 | 4/2012 | Hung et al. | |
| 2013/0234305 A1 | 9/2013 | Lin et al. | |
| 2014/0132333 A1 | 5/2014 | Jin et al. | |
| 2014/0217546 A1 | 8/2014 | Yen et al. | |

(Continued)

*Primary Examiner* — Shuwang Liu
*Assistant Examiner* — Gina M McKie
(74) *Attorney, Agent, or Firm* — Hauptman Ham, LLP

(57) ABSTRACT

A radio frequency interconnect (RFI) includes a transmitter side connected to a first end of a channel, a receiver side connected to a second end of the channel opposite the first end and a calibration system. The receiver side includes at least one of the following configurations: (a) at least one gain control amplifier (GCA) or at least one analog to digital converter (ADC). The calibration system is configured to transmit a predetermined data set through the channel, receive an output from the at least one ADC or the at least one GCA, and calibrate the at least one ADC or the at least one GCA based on a measured data set. The output includes the measured data set based on the predetermined data set transmitted through channel.

20 Claims, 13 Drawing Sheets

(56) References Cited

U.S. PATENT DOCUMENTS

| | | | |
|---|---|---|---|
| 2014/0219317 A1* | 8/2014 | Jeong | H04B 1/707 375/130 |
| 2014/0253262 A1 | 9/2014 | Hsieh et al. | |
| 2014/0253391 A1 | 9/2014 | Yen | |
| 2015/0282068 A1* | 10/2015 | Rajagopal | H04W 52/0206 370/350 |
| 2016/0126970 A1* | 5/2016 | Xu | H03M 1/1023 341/118 |
| 2017/0117932 A1* | 4/2017 | Chen | H04W 52/0261 |
| 2017/0126462 A1* | 5/2017 | Hsueh | H04L 1/0001 |

* cited by examiner

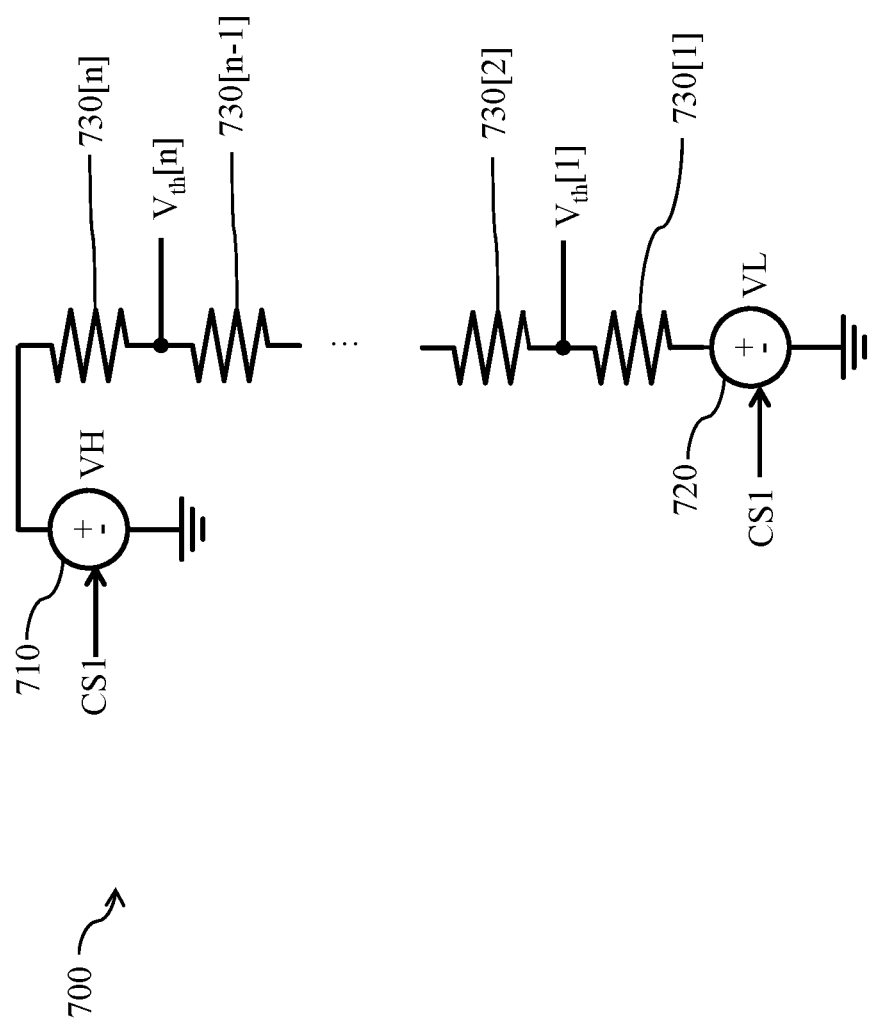

RADIO FREQUENCY INTERCONNECT INCLUDING CALIBRATION SYSTEM AND METHOD OF USING

In an electrical system, there are many integrated circuit (IC) chips arranged in one or more IC packages or many electrical devices, such as a memory, an analog-to-digital converter, wireless communication devices, or an application processor, in a chip. In some applications, data communication among different IC chips and/or different electrical devices are performed based on one or more communication protocols, such as a Serial Peripheral Interface (SPI) protocol or an Inter-Integrated Circuit (I²C) protocol. A radio frequency interconnect (RFI) has been implemented that links the devices to perform communication between the devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A is a diagram of a calibration circuit usable in an analog to digital converter (ADC), in accordance with some embodiments.

DETAILED DESCRIPTION

Figure 1:
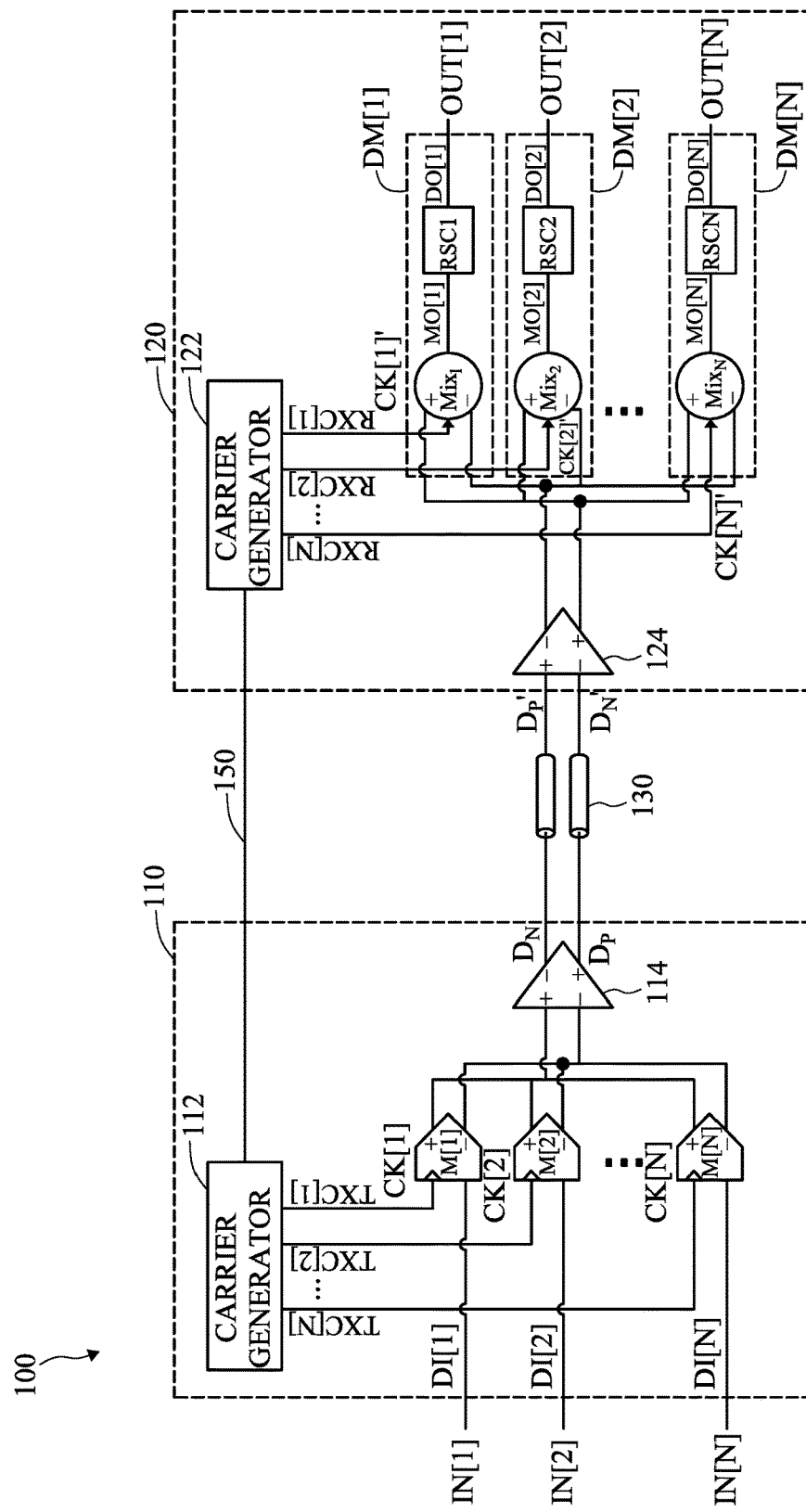
FIG. 1 is a block diagram of a data communication system, in accordance with some embodiments.

The following disclosure provides different embodiments, or examples, for implementing features of the provided subject matter. Specific examples of components and arrangements are described below to simplify the present disclosure. These are, of course, merely examples and are not limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The RFI discussed herein connects devices by a transmission line. In some embodiments, the individual components are on a single semiconductor substrate. In some embodiments, the individual components are on separate semiconductor substrates. In some embodiments, the devices include at least one of a memory device; a wireless communication device, e.g., a Bluetooth® module, a Zigbee® module, an IEEE 802.11 wireless networking module, or another suitable wireless communication device; an analog-to-digital converter, a digital-to-analog converter, a sensor module, a discrete application processor for performing operations in a low power state, a hardware processor, a memory controller, or another suitable device.

In accordance with some embodiments, an RFI includes a transmitter side connected to a first end of a channel, a receiver side connected to a second end of the channel opposite the first end and a calibration system. The receiver side includes at least one of the following configurations: (a) at least one gain control amplifier (GCA); or (b) at least one analog to digital converter (ADC). The calibration system is configured to transmit a predetermined data set through the channel, receive an output from the at least one ADC or the at least one GCA, and calibrate the at least one ADC and the at least one GCA based on a measured data set. The output of the at least one ADC includes the measured data set based on the predetermined data set transmitted through channel.

The calibration system overcomes distortion introduced by a channel or a demodulator by adjusting a gain of the GCA or adjusting a threshold voltage of the ADC. Distortion from the demodulator is attributed to process, voltage and/or temperature (PVT) variations of the demodulator. In some embodiments, compared with an RFI not using the gain adjusting circuit, the RFI according to the present disclosure consumes less power by adjusting the gain and the output response of the GCA. In some embodiments, the output response of the GCA of the present disclosure is adjusted to overcome PVT variations.

FIG. 1 is a block diagram of a data communication system 100, in accordance with some embodiments. Data communication system 100 is useable as an RFI. Data communication system 100 includes a transmitter 110, a receiver 120 and a transmission line 130. Transmission line 130 electrically couples transmitter 110 and receiver 120. In addition to transmission line 130, one or more channels 150 electrically couple transmitter 110 and receiver 120. In some embodiments, channel 150 is not used to electrically couple transmitter 110 and receiver 120. Data communication system 100 is configured to transmit data communications, signaling communications or command communications.

In some embodiments, transmitter 110 and receiver 120 are in different IC chips having different IC packages. In some embodiments, transmitter 110 and receiver 120 are in different IC chips within a common IC package. In some embodiments, transmitter 110 and receiver 120 are in different electrical devices of a common IC chip.

Transmitter 110 is coupled to N input data lines IN[1], IN[2], and IN[N], where N is a positive integer equal to or greater than 1. Each data line of input data lines IN[1], IN[2], and IN[N] is configured to carry input data in the form of data signals DI[1], DI[2], or DI[N]. Transmitter 110 is configured to receive input data in the form of data signals DI[1], DI[2], or DI[N] by input data lines IN[1], IN[2], and IN[N], modulate the input data in the form of data signals DI[1], DI[2], or DI[N] based on a different carrier signal CK[1], CK[2], and CK[N] for each of the input data lines IN[1], IN[2], and IN[N], and transmit the modulated data in the form of a modulated data signal to receiver 120.

Transmitter 110 includes a carrier generator 112, N modulators M[1], M[2], and M[N], and a driver amplifier 114. Carrier generator 112 is connected with driver amplifier 114 by the N modulators M[1], M[2], and M[N].

Carrier generator 112 is configured to generate N carrier signals CK[1], CK[2], and CK[N] on corresponding carrier lines TXC[1], TXC[2], and TXC[N]. Each carrier signal of the carrier signals CK[1], CK[2], and CK[N] is a continuous wave signal having a different fundamental frequency.

Each modulator of modulators M[1], M[2], and M[N] has a clock input terminal coupled with a corresponding carrier line of carrier lines TXC[1], TXC[2], and TXC[N] and a data terminal coupled with a corresponding data line of input data lines IN[1], IN[2], and IN[N]. Each modulator of modulators M[1], M[2], and M[N] is configured to output modulated data to driver amplifier 114 in a form of a pair of differential signals.

Driver amplifier 114 is configured to generate an amplified modulated signal to be transmitted on transmission line 130 based on various modulated input data from modulators M[1], M[2], and M[N]. In some embodiments, a summing block (not shown) is connected between the modulators M[1], M[2], and M[N] and driver amplifier 114. In some embodiments, a multiplexer (not shown) is connected between the modulators M[1], M[2], and M[N] and driver amplifier 114.

Transmission line 130 includes two conductive lines suitable to transmit a signal in a differential mode. The modulated signal transmitted on transmission line 130 is also in a form of a pair of differential signals $D_P$ and $D_N$ at the output terminals of driver amplifier 114. In some embodiments, driver amplifier 114 is a low noise amplifier (LNA).

Receiver 120 is coupled to transmission line 130, and N output data lines OUT[1], OUT[2], and OUT[N]. Each data line of output data lines OUT[1], OUT[2], and OUT[N] is configured to carry demodulated data in the form of a demodulated data signal DO[1], DO[2], or DO[N]. Receiver 120 includes a carrier generator 122, N demodulators DM[1], DM[2], and DM[N], and a receiver amplifier 124.

Carrier generator 122 is configured to generate N carrier signals CK[1]', CK[2]', and CK[N]'. Each carrier signal of carrier signals CK[1]', CK[2]', and CK[N]' and a corresponding carrier signal of carrier signals CK[1], CK[2], and CK[N] have the same carrier clock frequency, or a difference thereof is within a predetermined engineering tolerance.

A phase error between carrier signals CK[1]', CK[2]', and CK[N]' and the amplified modulated signal from receiver amplifier 124 is preemptively compensated for by carrier generator 122. In some embodiments, carrier generator 112 and carrier generator 122 are coupled through channel 150 to exchange control information, sample carrier signals, or other carrier-related information. In some embodiments, channel 150 is a physical channel that includes one or more conductive lines. In some embodiments, channel 150 is a logical channel, and the actual electrical signals are exchanged through transmission line 130.

Receiver amplifier 124 is configured to receive an amplified modulated signal transmitted on transmission line 130. The amplified modulated signal received by receiver amplifier 124 from transmission line 130 is also in a form of a pair of differential signals $D_P'$ and $D_N'$ at the input terminals of receiver amplifier 124. Compared with the pair of differential signals $D_P$ and $D_N$, the pair of differential signals $D_P'$ and $D_N'$ have a delay and a channel distortion caused by transmission line 130. In some embodiments, receiver amplifier 124 is an LNA. Receiver amplifier 124 is also configured to output amplified modulated signal to demodulators DM[1], DM[2], and DM[N]. In some embodiments, a summing block (not shown) is connected between the demodulators DM[1], DM[2], and DM[N] and receiver amplifier 124. In some embodiments, a multiplexer (not shown) is connected between the demodulators DM[1], DM[2], and DM[N] and receiver amplifier 124.

Demodulators DM[1], DM[2], and DM[N] are coupled to receiver amplifier 124 to receive the amplified modulated signal and are coupled to carrier generator 122 through corresponding carrier lines RXC[1], RXC[2], and RXC[N]. Each demodulator of demodulators DM[1], DM[2], and DM[N] outputs a demodulated data signal DO[1], DO[2], and DO[N] based on the amplified modulated signal from receiver amplifier 124 and carrier signals CK[1]', CK[2]', and CK[N]' on corresponding carrier lines RXC[1], RXC[2], and RXC[N]. Each demodulator of demodulators DM[1], DM[2], and DM[N] is coupled to a corresponding data line of output data lines OUT[1], OUT[2], and OUT[N].

In some embodiments, each modulator of modulators M[1], M[2], and M[N] modulates the input data based on a Quadrature Amplitude Modulation (QAM) scheme having a predetermined number of constellation points. In some embodiments, the predetermined number of constellation points ranges from 64 to 1026. Demodulators DM[1], DM[2], and DM[N] are configured to match the modulation scheme of the corresponding modulators M[1], M[2], and M[N]. In some embodiments, modulators M[1], M[2], and M[N] and corresponding demodulators DM[1], DM[2], and DM[N] are configured based on a Phase Shift Keying (PSK) scheme or other suitable modulation schemes. In some embodiments, modulators M[1], M[2], and M[N] and corresponding demodulators DM[1], DM[2], and DM[N] are implemented to have two or more different modulation schemes or settings.

Figure 2:
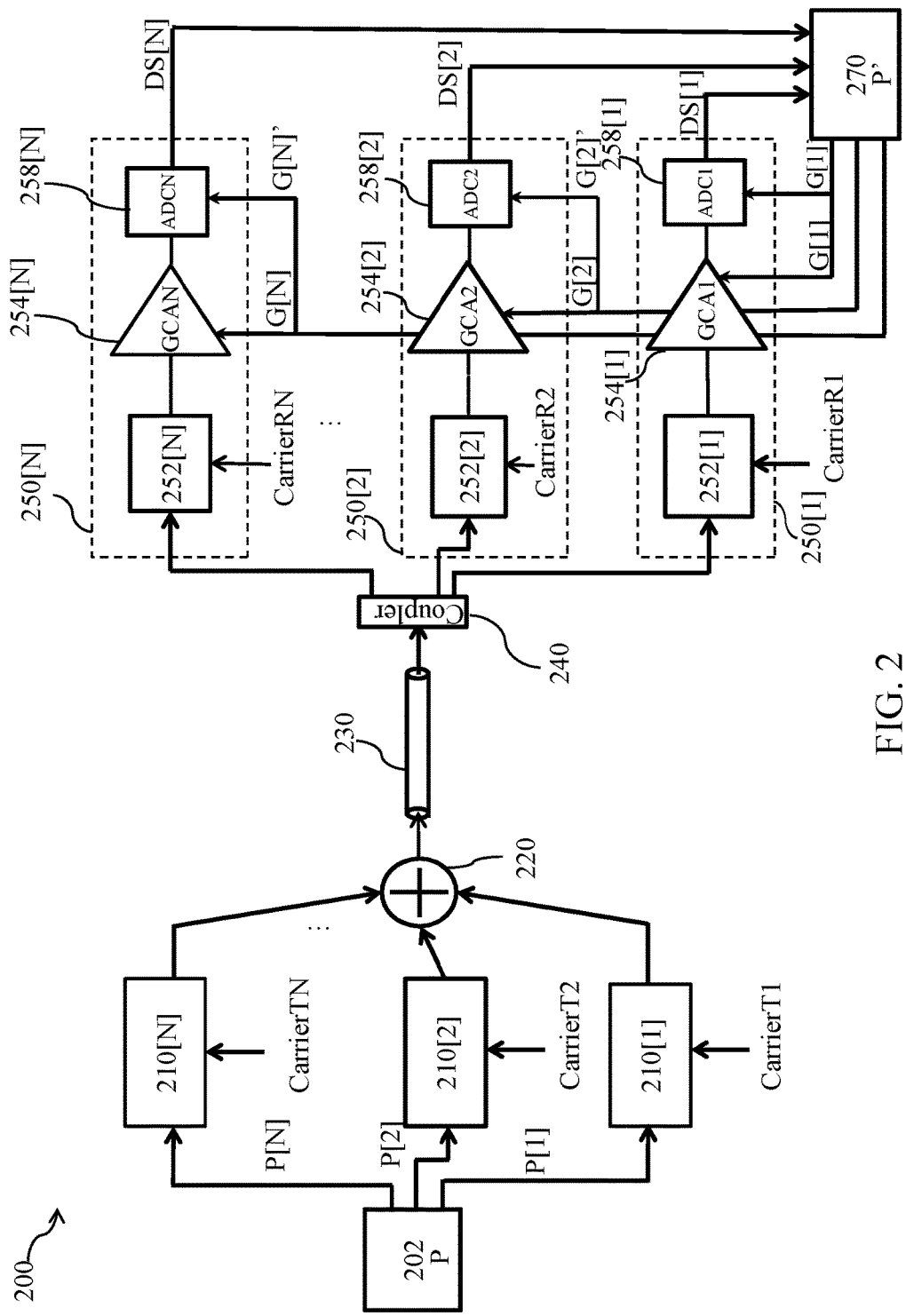
FIG. 2 is a block diagram of a simplified RFI including a calibration system, in accordance with some embodiments.
Figure 4A:
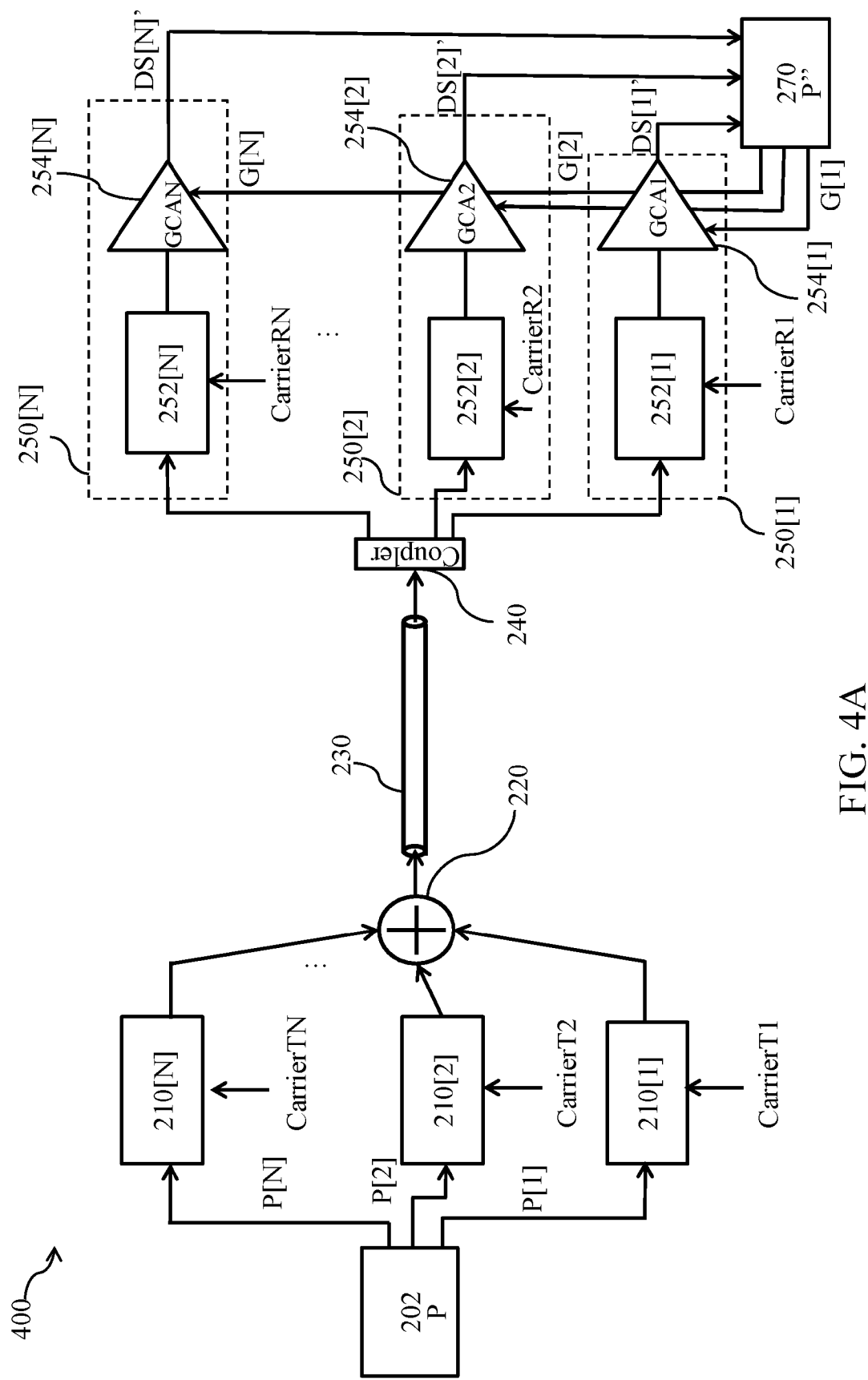
FIG. 4A is a block diagram of a simplified RFI including a calibration system, in accordance with some embodiments.
Figure 4B:
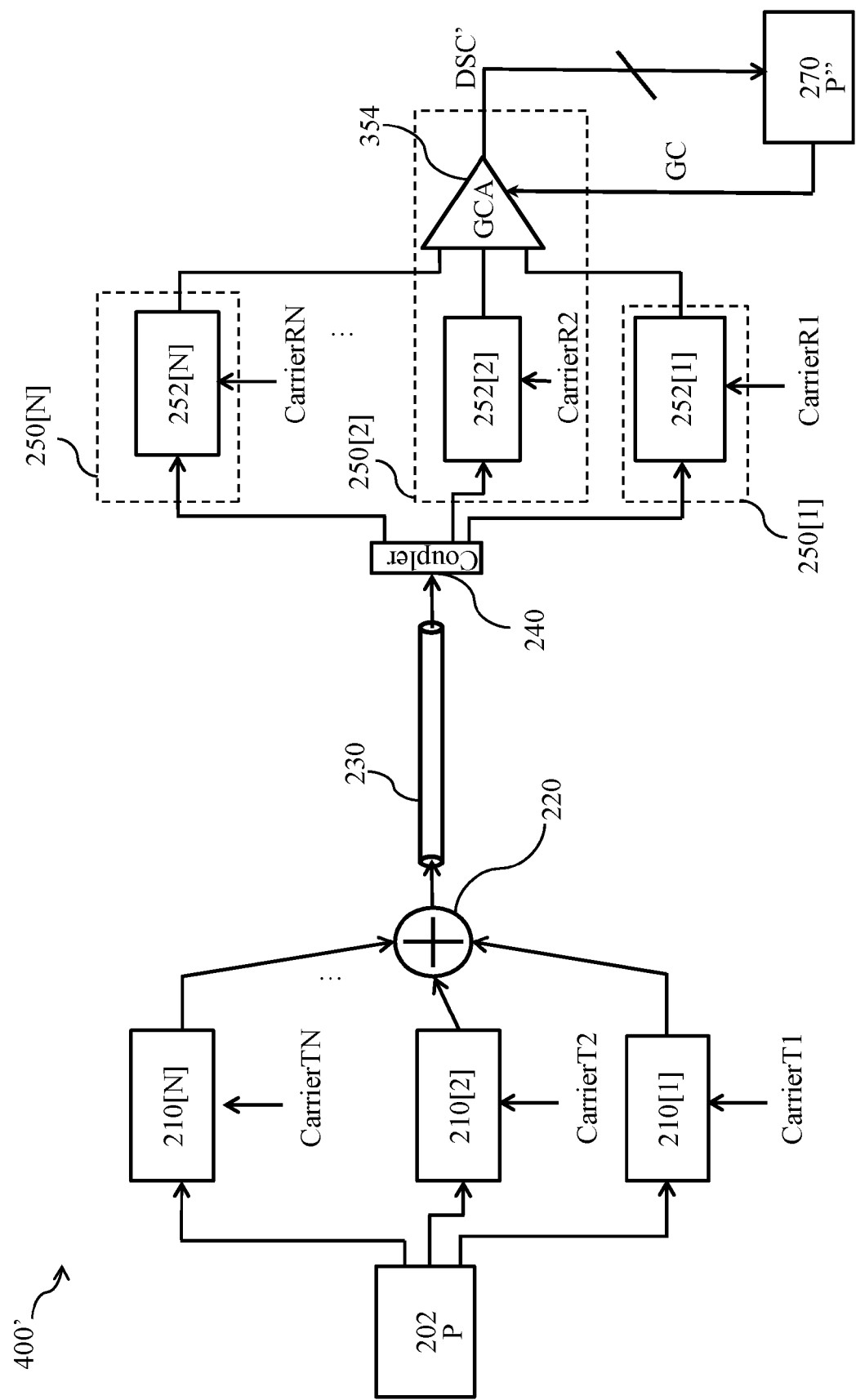
FIG. 4B is a block diagram of a simplified RFI including a calibration system, in accordance with some embodiments.
Figure 5A:
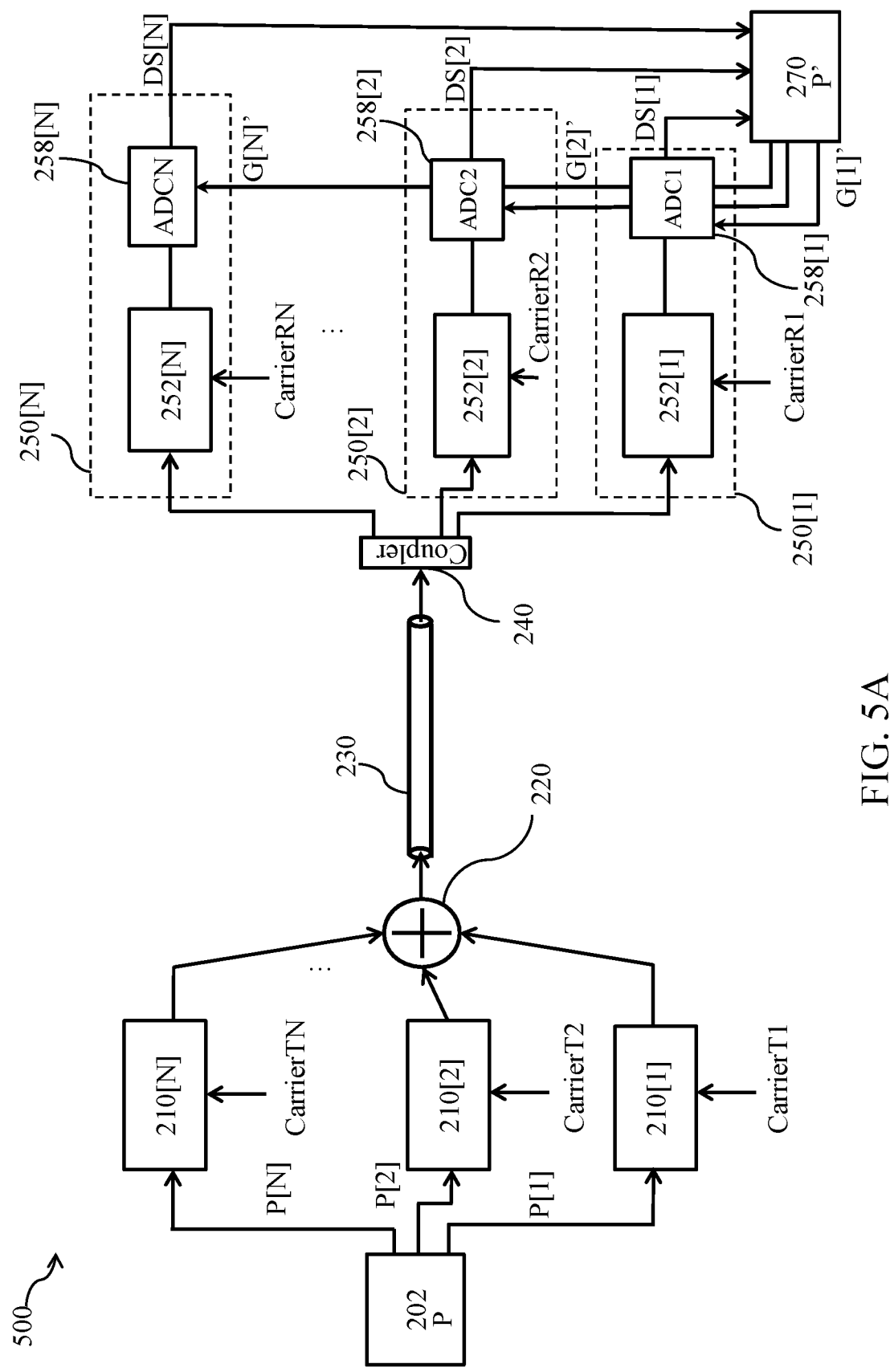
FIG. 5A is a block diagram of a simplified RFI including a calibration system, in accordance with some embodiments.
Figure 5B:
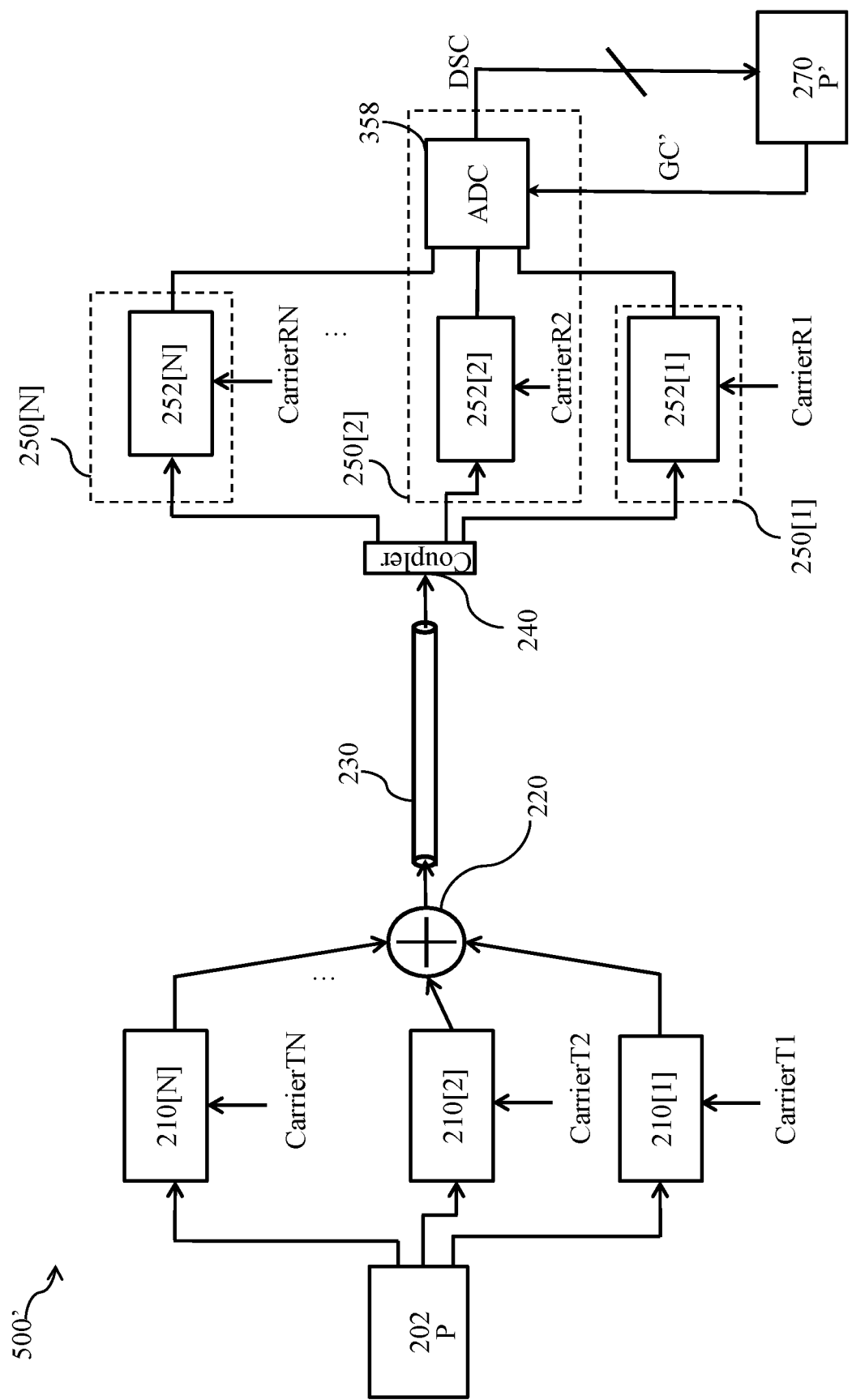
FIG. 5B is a block diagram of a simplified RFI including a calibration system, in accordance with some embodiments.

Demodulators DM[1], DM[2], and DM[N] include mixers $MIX_1$, $MIX_2$, and $MIX_N$ and received signal circuit (RSC) RSC1, RSC2 and RSCN. In some embodiments, each demodulator of demodulators DM[1], DM[2], and DM[N] includes a corresponding mixer $MIX_1$, $MIX_2$, and $MIX_N$ and a corresponding received signal circuit (referred to as signal circuit) RSC1, RSC2 and RSCN. In some embodiments, each received signal circuit RSC1, RSC2 and RSCN includes corresponding gain control amplifiers (GCA) GCA1, GCA2 and GCAN (FIG. 2) and corresponding analog to digital converters (ADC) ADC1, ADC2 and ADCN (FIG. 2). In some embodiments, a single RSC of the received signal circuits RSC1, RSC2 and RSCN includes a single GCA (e.g., GCA 354, FIG. 3) and a single ADC (e.g., ADC 358, FIG. 3). In some embodiments, received signal circuit RSC1, RSC2 and RSCN includes GCAs (FIGS. 4A-4B). In some embodiments, received signal circuit RSC1, RSC2 and RSCN includes ADCs (FIGS. 5A-5B).

Mixers $MIX_1$, $MIX_2$, and $MIX_N$ are coupled to receiver amplifier 124 to receive the amplified modulated signal and are coupled to carrier generator 122 through corresponding carrier lines RXC[1], RXC[2], and RXC[N]. Each mixer of mixers $MIX_1$, $MIX_2$, and $MIX_N$ outputs a mixed data signal MO[1], MO[2], and MO[N] based on the amplified modulated signal from receiver amplifier 124 and carrier signals CK[1]', CK[2]', and CK[N]' on corresponding carrier lines RXC[1], RXC[2], and RXC[N]. In some embodiments, one or more mixed data signals of the mixed data signal MO[1], MO[2], and MO[N] correspond to an intermediate frequency (IF) signal.

Signal circuits RSC1, RSC2 and RSCN are coupled to Mixers $MIX_1$, $MIX_2$, and $MIX_N$ to receive the mixed data signals MO[1], MO[2], and MO[N]. Each signal circuit of signal circuits RSC1, RSC2 and RSCN outputs a corresponding demodulated data signal DO[1], DO[2], and DO[N]. In some embodiments, each demodulated data signal of the demodulated data signal DO[1], DO[2], and DO[N] corresponds to an amplified version of the mixed data signal MO[1], MO[2], and MO[N]. In some embodiments, each demodulated data signal of the demodulated data signal DO[1], DO[2], and DO[N] corresponds to a digital version of mixed data signal MO[1], MO[2], and MO[N].

Each signal circuit of signal circuits RSC1, RSC2 and RSCN is coupled to a corresponding data line of output data lines OUT[1], OUT[2], and OUT[N]. In some embodiments, one or more signal circuits of signal circuits RSC1, RSC2 and RSCN is optional.

FIG. 2 is a block diagram of a simplified RFI 200 including a calibration system in accordance with some embodiments. In some embodiments, RFI 200 is a simplified version of data communication system 100 (FIG. 1) and same elements have a same functionality. Modulators 210[1] to 210[N], collectively referred to as modulators 210, where N is a positive integer equal to or greater than 1, is usable as modulators M[1] to M[N] (FIG. 1). Demodulators 250[1] to 250[N], collectively referred to as demodulators 250, where N is a positive integer equal to or greater than 1, is usable as demodulators DM[1] to DM[N] (FIG. 1). Amplifiers 254[1] to 254[N], collectively referred to as GCAs 254, and analog to digital converters 258[1] to 258[N], collectively referred to as ADCs 258, where N is a positive integer equal to or greater than 1, is usable as signal circuits RSC[1] to RSC[N] (FIG. 1).

RFI 200 includes a transmitter side (preamble transmitter 202, modulators 210 and combiner 220) connected to a receiver side (coupler 240, demodulators 250 and preamble receiver 270) by a channel 230.

Preamble transmitter 202 is connected to modulators 210. Preamble transmitter 202 is configured to receive input data DI[1] to DI[N] (FIG. 1) by input data lines IN[1] to IN[N], add a predetermined data set P[1] to P[N] to the input data to generate a data packet. Preamble transmitter 202 is configured to output the data packet including the predetermined data set P[1] to P[N], collectively referred to as predetermined data set P, to modulators 210. In some embodiments, the predetermined data set P corresponds to a preamble. In some embodiments, each predetermined data set P[1] to P[N] is unique with respect to each other. In some embodiments, the predetermined data set P is a sequence of bits indicative of a beginning portion of payload data (e.g., input data DI[1] to DI[N]) or an end of a header portion of a data packet.

Each modulator 210[1] to 210[N] is configured to receive a corresponding carrier signal, i.e., carrier T1 to carrier TN and the data packet (including the predetermined data set P). A combiner 220 is configured to receive outputs of modulators 210 and to provide a combined output to a channel 230. Channel 230 is connected between combiner 220 on a transmitter side of RFI 200 and a coupler 240 on a receiver side of RFI 200. Coupler 240 is configured to receive an output of channel 230 and direct the received output to demodulators 250. Demodulators 250 are configured to receive carrier signals, i.e., carrier R1 to carrier RN, for demodulating the signal transmitted through channel 230. Each demodulator 250[1] to 250[N] includes a corresponding mixer 252[1] to 252[N], collectively referred to as mixers 252, a corresponding amplifier 254[1] to 254[N], collectively referred to as GCAs 254, and a corresponding analog to digital converter 258[1] to 258[N], collectively referred to as ADCs 258.

Demodulators 250 are configured to output a data signal DS[1] to DS[N], collectively referred to as data signal DS, to preamble receiver 270. Preamble receiver 270 is configured to receive data signal DS and to provide a first calibration signal G[1] to G[N], collectively referred to as first calibration signals G, to the corresponding amplifier 254[1] to 254[N]. Preamble receiver 270 is configured to receive data signal DS and to provide a second calibration signal G[1]' to G[N]', collectively referred to as second calibration signals G', to the corresponding converter 258[1] to 258[N]. In some embodiments, each first calibration signal G[1] to G[N] includes one or more bits. In some embodiments, each second calibration signal G[1]' to G[N]' includes one or more bits. In some embodiments, a number of GCAs in FIG. 2 is varied such that a total number of GCAs is at least one. In some embodiments, a number of ADCs in FIG. 2 is varied such that a total number of ADCs is at least one.

Mixers 252 are coupled to coupler 240 to receive the output of channel 230. Mixers 252 receive carrier signals, i.e., carrier R1 to carrier RN, for mixing the signal transmitted through channel 230, and output the mixed signal to GCAs 254.

GCAs 254 are coupled to mixers 252 to amplify the received mixed signals based on an amplifier gain. GCAs 254 are also coupled to preamble receiver 270 to receive first calibration signals G. GCAs 254 are also coupled to ADCs 258 to output an amplified signal to ADCs 258. In some embodiments, the amplified signal output by GCAs 254 corresponds to an amplified mixed data signal. In some embodiments, the amplified signal output by GCAs 254 corresponds to a demodulated data signal (e.g., DO[1] to DO[N] (FIG. 1)). GCAs 254 are also configured to receive first calibration signals G from the preamble receiver 270. The first calibration signals G control the gain of the GCAS 254. Each amplifier 254[1] to 254[N] has a gain that is controlled by a corresponding first calibration signal G[1] to G[N]. By adjusting the first calibration signals G[1] to G[N], the corresponding gain of each amplifier 254[1] to 254[N] is adjusted.

ADCs 258 are coupled to GCAs 254 to receive the amplified signals. ADCs 254 are configured to convert analog signals received from GCAs 254 into digital signals. ADCs 258 are also coupled to preamble receiver 270 to receive second calibration signals G'. ADCs 258 are configured to output data signal DS to the preamble receiver 270. Data signal DS output by ADCs 258 corresponds to a digital signal. In some embodiments, data signal DS output by ADCs 258 corresponds to a demodulated data signal (e.g., DO[1] to DO[N] (FIG. 1)). ADCs 258 are also configured to receive second calibration signals G' from the preamble receiver 270. The second calibration signals G' control a threshold voltage of the ADCs 258. Each ADC 258[1] to 258[N] has a threshold voltage that is controlled by a corresponding second calibration signal G[1]' to G[N]'. By adjusting the second calibration signals G[1]' to G[N]', the corresponding threshold voltage of each ADC 258[1] to 258[N] is adjusted.

Preamble receiver 270 is configured to receive data signal DS. In some embodiments, data signal DS corresponds to a received data packet, and preamble receiver 270 is configured to extract a measured data set P' from the received data packet. In these embodiments, preamble receiver 270 is also configured to output a remaining portion of the received data packet (e.g., a portion of the received data packet that does not include the measured data set P') to the output data lines OUT (FIG. 1). In some embodiments, data signal DS corresponds to the measured data set P'. Preamble receiver 270 is configured to compare the measured data set P' with the predetermined data set P, and to output first calibration signals G to GCAs 254 and second calibration signals G' to ADCs 258. In some embodiments, preamble receiver 270 is configured to generate first calibration signals G or second calibration signals G' based on the comparison between the measured data set P' and the predetermined data set P.

The calibration system of RFI 200 includes preamble transmitter 202 configured to provide a predetermined data set P to modulators 210, and a preamble receiver 270 configured to receive an output (e.g., data signal DS) from demodulators 250 and to provide first calibration signals G to GCAs 254 and second calibration signals G' to ADCs 258.

The calibration system of RFI 200 is configured to calibrate RFI 200 prior to transmitting of data during normal operation of RFI 200 in order to compensate for signal loss or attenuation from channel 230. In some embodiments, the frequency response of channel 230 is not substantially flat such that signals with different frequencies that propagate through channel 230 experience a different amount of attenuation. In approaches which do not include a calibration system, a demodulator has a larger bit error rate (BER) from lower signal to noise ratios (SNRs) that are attributed to the signal attenuation from the channel. The calibration system of RFI 200 is configured to compensate for signal attenuation attributed to the channel. By calibrating GCAs 254 or ADCs 258 of demodulators 250, the SNR of the data demodulated by the calibration system of RFI 200 is increased in comparison with systems which do not include the calibration system. By calibrating GCAs 254 or ADCs 258 of demodulators 250, the BER of the calibration system of RFI 200 is reduced in comparison with systems which do not include the calibration system. In some embodiments, the calibration of GCAs 254 or ADCs 258 of demodulators 250 overcomes signal distortion introduced by channel 230.

Preamble transmitter 202 and preamble receiver 270 both have the predetermined data set P stored therein in order to accurately and precisely compare outputs of ADCs 258 (e.g., measured data set P') with the values of the predetermined data set P. In some embodiments, preamble transmitter 202 and preamble receiver 270 include multiple predetermined data sets P in order to facilitate calibration using several different predetermined data sets. By calibrating using several different predetermined data sets P, a precision of the calibration of GCAs 254 or ADCs 258 is increased with respect to a calibration using a single predetermined data set P.

In some instances, a calibration of GCAs 254 or ADCs 258 is repeated in order to account for any changes to the GCAs 254 or the ADCs 258 during operation. In some instances, a calibration of ADCs 254 is repeated in order to account for drift of the ADCs 254 during operation. In some embodiments, re-calibration of GCAs 254 or ADCs 258 is initiated by a user input. In some embodiments, RFI 200 includes a timer connected to each of preamble transmitter 202 and preamble receiver 270 in order to implement a re-calibration process following a predetermined time duration. In some embodiments, RFI 200 includes a counter connected to each of preamble transmitter 202 and preamble receiver 270 in order to implement a re-calibration process based on an amount of data transferred by RFI 200.

Calibration of GCAs 254 is implemented by receipt of first calibration signals G. Calibration of GCAs 254 is implemented by adjusting resistors within the GCAs 254 based on the first calibration signals G. In some embodiments, GCAs 254 include adjustable resistors in order to adjust the gain of the amplifier. In some embodiments, the number of adjustable resistors in amplifier 254[1] to 254[N] corresponds to a number of bits in the corresponding first calibration signal G.

Calibration of ADCs 258 is implemented by receipt of second calibration signals G'. Calibration of ADCs 258 is implemented by adjusting threshold voltages within the ADCs 258 based on the second calibration signals G'. In some embodiments, calibration of ADCs 258 is implemented by adjusting threshold voltages within the ADCs 258. Each of the ADCs of ADC 258 has a corresponding threshold voltage that is used to convert a received analog signal to a digital signal. In some embodiments, ADCs 258 include adjustable voltage sources in order to adjust the threshold voltages of the corresponding ADCs 258. In some embodiments, ADCs 258 include adjustable resistors in order to adjust the threshold voltage of the ADC. In some embodiments, each adjustable resistor of ADC 258 has a terminal configured to receive second calibration signal G'. In some embodiments, a number of adjustable resistors in ADCs 258[1] to 258[N] corresponds to a number of bits in the corresponding second calibration signal G'. In some embodiments, ADCs 258 include both adjustable voltage sources and adjustable resistors in order to adjust the threshold voltages. In some embodiments, a first ADC, e.g., ADC 258[1], includes an adjustable voltages source, and a second ADC, e.g., ADC 258[2], includes adjustable resistors.

In operation, preamble transmitter 202 transmits the predetermined data set P to modulators 210. Based on a frequency division multiplexing (or time division multiplexing), modulators 210 output multiple signals to combiner 220. These signals are combined and supplied to channel 230. The signals propagate through channel 230 to coupler 240. Coupler 240 separates the signals from channel 230 and supplies the separated signals to corresponding demodulators 250. The mixers 252 in demodulators 250 generate mixed signals based on the carrier signals, i.e., carrier R1 to carrier RN, and the modulated signal transmitted through channel 230. The mixers 252 in demodulators 250 output the mixed signals to GCAs 254. GCAs 254 amplify the mixed signals based on the gain within the GCAs. GCAs output the amplified signal to ADCs 258. ADCs 258 output data signal DS to preamble receiver 270 based on the threshold voltages of the ADCs 258. Preamble receiver 270 receives output data signal DS. Preamble receiver 270 compares the predetermined data set P to the measured data set P' (based on data signal DS). Based on differences between the predetermined data set P and the measured data set P', preamble receiver 270 generates first calibration signals G[1] to G[N] for each corresponding amplifier 254[1] to 254[N] or second calibration signals G[1]' to G[N]' for each corresponding ADC 258[1] to 258[N]. Each first calibration signal G[1] to G[N] is used to adjust resistances within each corresponding amplifier 254[1] to 254[N]. Each second calibration signal G[1]' to G[N]' is used to adjust threshold voltages used by each ADC 258[1] to 258[n] during conversion of the analog signals to digital signals.

Following calibration of GCAs 254 or ADCs 258, RFI 200 is able to transfer data with higher precision (lower BERs and higher SNRs) when compared with non-calibrated RFIs. For example, following calibration of GCAs 254 or ADCs 258, RFI 200 is able to transmit/receive data that accounts for distortion introduced by channel 230 or the receiver side of RFI 200. In some embodiments, distortion includes amplitude distortion or phase distortion. In some embodiments, a calibration process is performed multiple times prior to transmission of data other than the predetermined data set. In some embodiments, preamble transmitter 202 and preamble receiver 270 include multiple predetermined data sets in order to facilitate repeated calibration of GCAs 254 or ADCs 258. In some embodiments, calibration is performed only prior to transmission of data other than the predetermined data set. In some embodiments, calibration is performed intermittently during operation of RFI 200. In some embodiments, a period between calibrations is determined based on a volume of data transferred using RFI 200. In some embodiments, a period between calibrations is determined based on a time duration between calibrations. In some embodiments, a calibration process is initiated in response to a user input.

Figure 3:
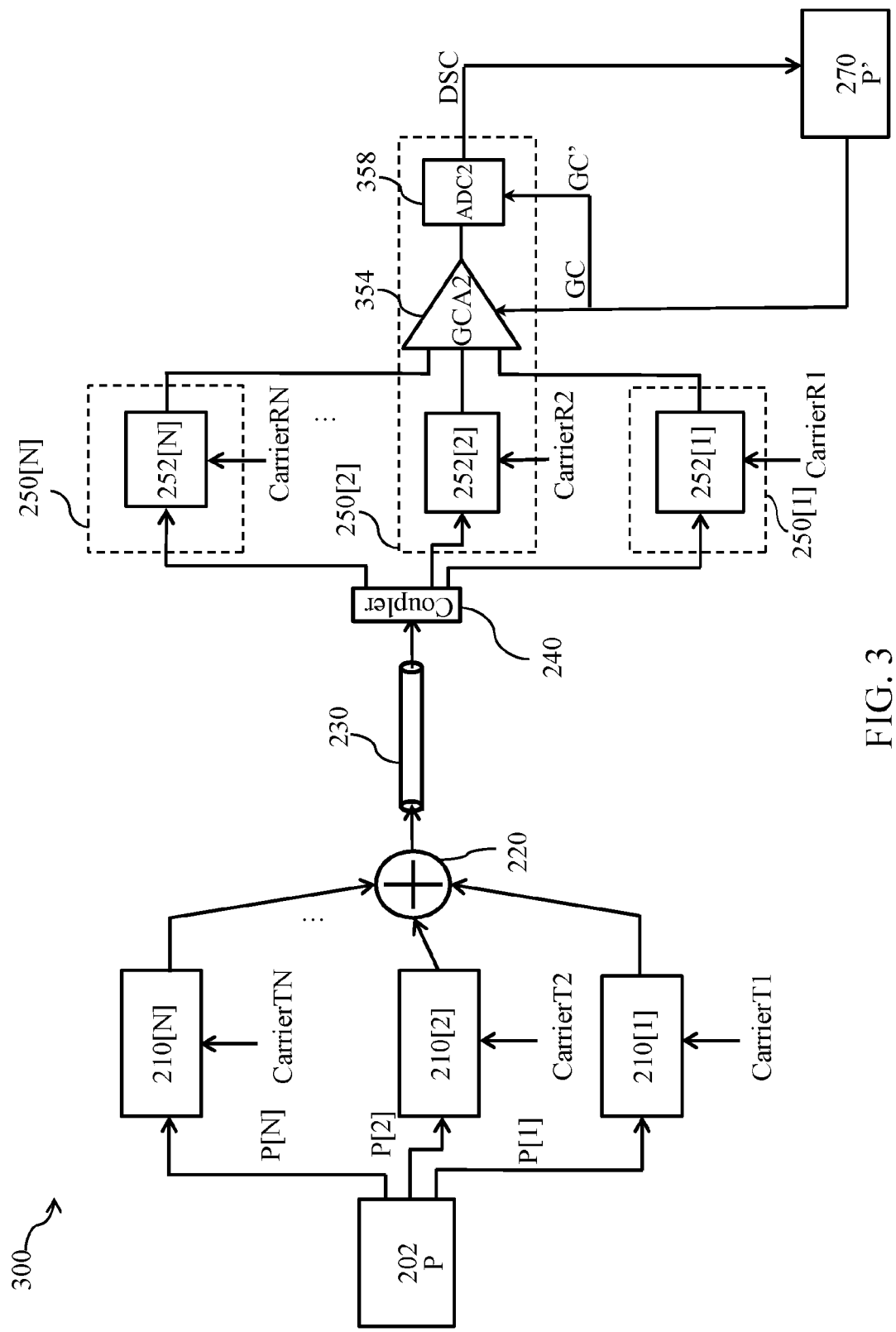
FIG. 3 is a block diagram of a simplified RFI including a calibration system, in accordance with some embodiments.

FIG. 3 is a block diagram of a simplified RFI 300 including a calibration system in accordance with some embodiments. In some embodiments, RFI 300 is a simplified version of data communication system 100 (FIG. 1) and same elements have a same functionality. RFI 300 is an embodiment of RFI 200 (FIG. 2). GCA 354 is an embodiment of GCAs 254 (FIG. 2). ADC 358 is an embodiment of ADCs 258.

In comparison with RFI 200 (FIG. 2), RFI 300 includes a single amplifier (GCA 354) and a single ADC (ADC 358). In comparison with GCAs 254 (FIG. 2), GCA 354 is configured to receive a mixed signal from each of the mixers 252[1] to 252[N]. In comparison with ADCs 258 (FIG. 2), ADC 358 is configured to receive an amplified signal from GCA 354. In comparison with GCAs 254 (FIG. 2), each of the mixers 252[1] to 252[N] is connected to the GCA 354. In comparison with GCAs 254 (FIG. 2), GCA 354 is configured to output an amplified signal to the ADC 358. In comparison with ADCs 258 (FIG. 2), ADC 358 is configured to output a data signal DSC to the preamble receiver 270. In some embodiments, data signal DSC is a multi-output signal. In comparison with GCAs 254 (FIG. 2), GCA 354 is configured to receive a first calibration signal GC from the preamble receiver 270. In comparison with ADCs 258 (FIG. 2), ADC 358 is configured to receive a second calibration signal GC' from the preamble receiver 270. In some embodiments, first calibration signal GC or second calibration signal GC' is a multi-input signal.

In some embodiments, data signal DSC is a multi-output signal or first calibration signal GC is a multi-input signal which allows each mixer of the mixers 252[1] to 252[N] to have a corresponding gain within the GCA 354. In these embodiments, an amplitude of each mixed signal of the mixed signals MO[1] to MO[N] (FIG. 1) is adjusted individually by GCA 354 based on the corresponding gain. In these embodiments, an amplitude of each mixed signal of the mixed signals MO[1] to MO[N] (FIG. 1) is adjusted individually by GCA 354 based on first calibration signal GC. In some embodiments, data signal DSC is a multi-output signal and second calibration signal GC' is a multi-input signal. In some embodiments, each mixer of the mixers 252[1] to 252[N] have a same gain within the GCA 354. In these embodiments, an amplitude of each mixed signal of the mixed signals MO[1] to MO[N] (FIG. 1) is adjusted similarly by GCA 354 based on the same gain.

FIG. 4A is a block diagram of a simplified RFI 400 including a calibration system in accordance with some embodiments. In some embodiments, RFI 400 is a simplified version of data communication system 100 (FIG. 1) and the same elements have the same functionality. RFI 400 is an embodiment of RFI 200 (FIG. 2). Data signal DS[1]' to DS[N]', collectively referred to as data signal DS' is an embodiment of data signal DS (FIG. 2). Predetermined data set P''' is an embodiment of predetermined data set (FIG. 2).

In comparison with RFI 200 (FIG. 2), RFI 400 does not include ADCs 258. In some embodiments, one or more intermediary devices (not shown) are positioned between mixers 252 and GCAs 254. In some embodiments, the signal received by GCAs 254 corresponds to an analog signal or a digital signal. In comparison with RFI 200 (FIG. 2), RFI 400 does not include second calibration signal G'. In comparison with RFI 200 (FIG. 2), the output of each GCA 254 of RFI 400 is coupled to the preamble receiver 270. In comparison with RFI 200 (FIG. 2), GCAs 254 of RFI 400 are configured to output data signal DS' to the preamble receiver 270. Data signal DS' is an amplified signal. In some embodiments, data signal DS' is a digital signal. In some embodiments, data signal DS' is an analog signal.

In comparison with RFI 200 (FIG. 2), the preamble receiver 270 of RFI 400 is configured to compare the predetermined data set P to the measured data set P''' (based on data signal DS'). Based on differences between the predetermined data set P and the measured data set P''', preamble receiver 270 of RFI 400 generates first calibration signals G[1] to G[N] for each corresponding amplifier 254[1] to 254[N]. Each first calibration signal G[1] to G[N] is used to adjust resistances within each corresponding amplifier 254[1] to 254[N].

FIG. 4B is a block diagram of a simplified RFI 400' including a calibration system in accordance with some embodiments. In some embodiments, RFI 400' is a simplified version of data communication system 100 (FIG. 1) and the same elements have the same functionality. RFI 400' is an embodiment of RFI 300 (FIG. 3). Data signal DSC' is an embodiment of data signal DSC (FIG. 3). Predetermined data set P''' is an embodiment of predetermined data set (FIG. 3).

In comparison with RFI 300 (FIG. 3), RFI 400' does not include ADC 358. In some embodiments, one or more intermediary devices (not shown) are positioned between mixers 252 and GCA 354. In some embodiments, the signal received by GCA 354 corresponds to an analog signal or a digital signal. In comparison with RFI 300 (FIG. 3), RFI 400' does not include second calibration signal GC'. In comparison with RFI 300 (FIG. 3), the output of GCA 354 of RFI 400' is coupled to the preamble receiver 270. In comparison with RFI 300 (FIG. 3), GCA 354 of RFI 400' is configured to output data signal DSC' to the preamble receiver 270. Data signal DSC' is an amplified signal. In some embodiments, data signal DSC' is a digital signal. In some embodiments, data signal DSC' is an analog signal.

In comparison with RFI 300 (FIG. 3), the preamble receiver 270 of RFI 400' is configured to compare the predetermined data set P to the measured data set P''' (based on data signal DS'). Based on differences between the predetermined data set P and the measured data set P''', preamble receiver 270 of RFI 400' generates first calibration signal GC for the corresponding GCA 354. First calibration signal GC is used to adjust resistances within the corresponding GCA 354.

FIG. 5A is a block diagram of a simplified RFI 500 including a calibration system in accordance with some embodiments. In some embodiments, RFI 500 is a simplified version of data communication system 100 (FIG. 1) and the same elements have the same functionality. RFI 500 is an embodiment of RFI 200 (FIG. 2).

In comparison with RFI 200 (FIG. 2), RFI 500 does not include GCAs 254. In comparison with RFI 200 (FIG. 2), the input of each ADC 258 of RFI 500 is coupled to a corresponding mixer 252. The signal received by ADCs 258 corresponds to an analog signal. In some embodiments, one or more intermediary devices (not shown) are positioned between mixers 252 and ADCs 258. In some embodiments, the signal received by ADCs 258 is an amplified signal. In comparison with RFI 200 (FIG. 2), RFI 500 does not include first calibration signal G.

ADCs 258 of RFI 500 are configured to output data signal DS to the preamble receiver 270. In comparison with RFI 200 (FIG. 2), the preamble receiver 270 of RFI 500 is configured to compare the predetermined data set P to the measured data set P' (based on data signal DS). Based on differences between the predetermined data set P and the measured data set P', preamble receiver 270 of RFI 500 generates second calibration signals G[1]' to G[N]' for each corresponding ADC 258[1] to 258[N]. Each second calibration signal G[1]' to G[N]' is used to adjust threshold voltages within each corresponding ADC 258[1] to 258[N].

FIG. 5B is a block diagram of a simplified RFI 500' including a calibration system in accordance with some embodiments. In some embodiments, RFI 500' is a simplified version of data communication system 100 (FIG. 1) and the same elements have the same functionality. RFI 500' is an embodiment of RFI 300 (FIG. 3).

In comparison with RFI 300 (FIG. 3), RFI 500 does not include GCA 354. In comparison with RFI 300 (FIG. 3), the input of ADC 358 of RFI 500' is coupled to each mixer 252. The signal received by ADC 358 corresponds to an analog signal. In some embodiments, one or more intermediary devices (not shown) are positioned between mixers 252 and ADC 358. In some embodiments, the signal received by ADC 358 is an amplified signal. In comparison with RFI 300 (FIG. 3), RFI 500' does not include first calibration signal GC.

ADC 358 of RFI 500' is configured to output data signal DSC to the preamble receiver 270. In comparison with RFI 300 (FIG. 3), the preamble receiver 270 of RFI 500' is configured to compare the predetermined data set P to the measured data set P' (based on data signal DSC). Based on differences between the predetermined data set P and the measured data set P', preamble receiver 270 of RFI 500' generates second calibration signal GC' for ADC 358. Second calibration signal GC' is used to adjust threshold voltages within ADC 358.

Figure 6:
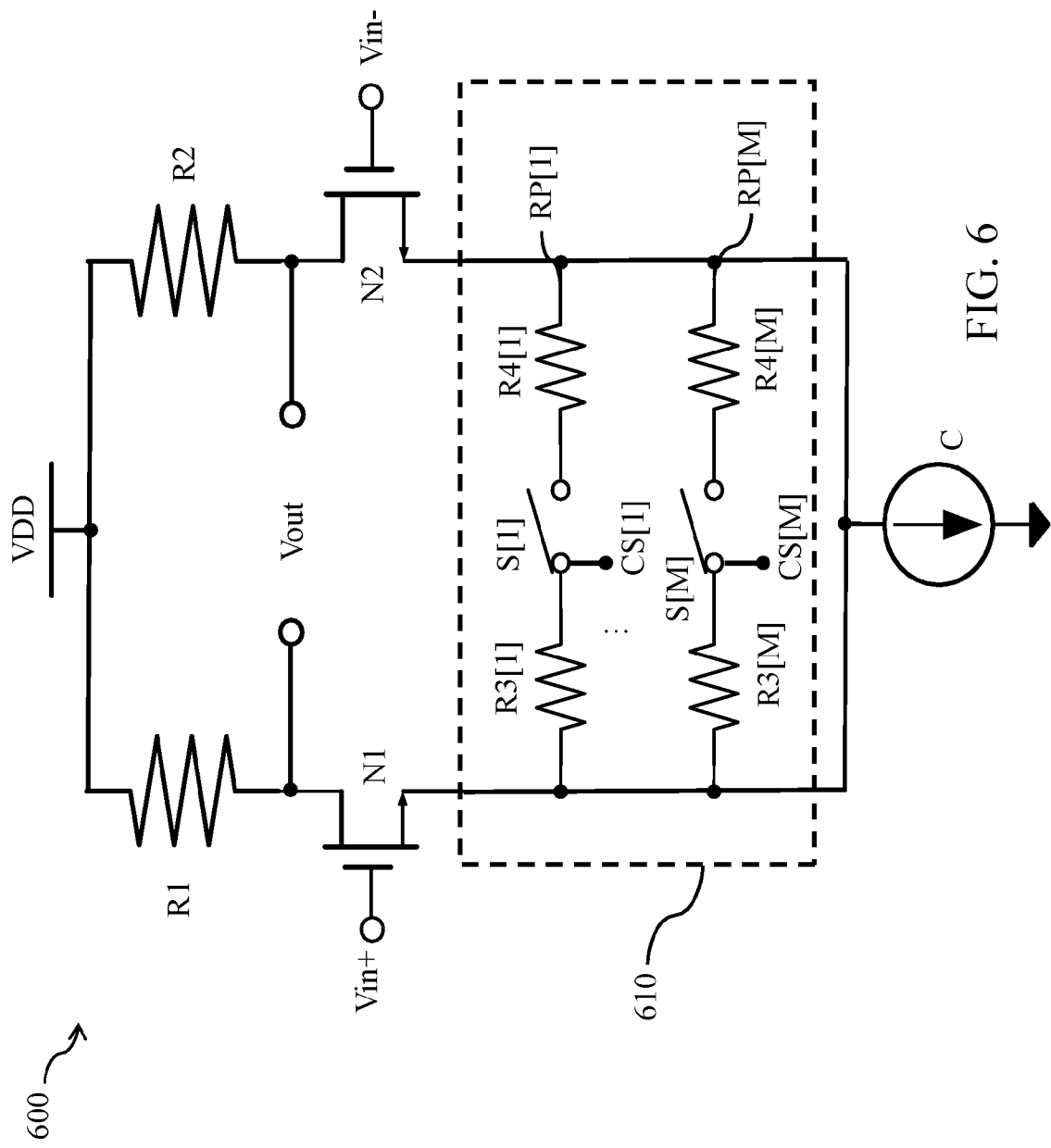
FIG. 6 is a circuit diagram of an amplifier usable in the RFI in FIGS. 2-4B, in accordance with some embodiments.

FIG. 6 is a circuit diagram of an amplifier 600 usable in GCA 254 (FIGS. 2 & 4A), in accordance with some embodiments. Amplifier 600 is usable as GCAs 254 (FIGS. 2 & 4A) or GCA 354 (FIGS. 3 & 4B). Amplifier 600 is usable as amplifiers GCA1, GCA2 and GCAN (FIG. 1).

Amplifier 600 is configured to receive a set of first calibration signals CS[1] to CS[M], collectively referred to as first calibration signals CS, where M is a positive integer greater than or equal to 1. First calibration signals CS is an embodiment of first calibration signal G (FIG. 2 or 4A) or first calibration signal GC (FIG. 3 or 4B). Amplifier 600 is also configured to receive a first signal Vin+ and a second signal Vin− from a mixer 252 (FIGS. 2-3). First signal Vin+ and second signal Vin− correspond to a differential input signal. In some embodiments, amplifier 600 corresponds to a differential amplifier. Amplifier 600 is configured to output an amplified signal Vout. In some embodiments, amplified signal Vout corresponds to the data signal DS output by demodulator 250 (FIG. 2).

Amplifier 600 includes a first resistor R1, a second resistor R2, a first n-type transistor N1, a second n-type transistor N2, a current source C and a variable resistor 610.

A gate terminal of a first n-type transistor N1 is configured to receive first signal Vin+. A source terminal of first n-type transistor N1 is connected to a first terminal of current source C and variable resistor 610. A drain terminal of first n-type transistor N1 is connected to a first terminal of first resistor R1. A second terminal of first resistor R1 is connected to an input terminal of a first reference node. In some embodiments, first reference node corresponds to a voltage source VDD.

A gate terminal of a second n-type transistor N2 is configured to receive second signal Vin−. A source terminal of second n-type transistor N2 is connected to the first terminal of current source C and variable resistor 610. A drain terminal of second n-type transistor N2 is connected to a first terminal of second resistor R2. A second terminal of second resistor R2 is connected to the first reference node. A second terminal of current source C is connected to a second reference node. In some embodiments, second reference node corresponds to ground. In some embodiments, a p-type transistor is usable in amplifier 600.

Variable resistor 610 is configured to receive first calibration signals CS. An equivalent resistance value of variable resistor 610 is adjusted based on first calibration signals CS. By adjusting the equivalent resistance value of variable resistor 610, the gain of amplifier 600 is adjusted.

Variable resistor 610 includes a set of resistor branches RP[1] to RP[M], where M is a positive integer greater than or equal to 1. Each resistor branch of the set of resistor branches RP[1] to RP[M] is configured in parallel with each other. Each resistor branch of the set of resistor branches RP[1] to RP[M] is configured to receive a corresponding configuration signal of the set of first calibration signals CS[1] to CS[M]. Each configuration signal of the set of first calibration signals CS[1] to CS[M] includes one or more bits. In some embodiments, the number of resistor branches RP[1] to RP[M] in amplifier 600 corresponds to the number of bits in the corresponding first calibration signal CS[1] to CS[M].

Each resistor branch of the set of resistor branches RP[1] to RP[M] includes a corresponding third resistor R3[1] to R3[M], a corresponding switch S[1] to S[M], and a corresponding fourth resistor R4[1] to R[M].

A first terminal of the third resistor R3[1] is connected to the source of first n-type transistor N1. A second terminal of the third resistor R3[1] is connected to a switch S[1]. Switch S[1] is connected to a first terminal of fourth resistor R4[1]. Fourth resistor R4[1] is connected to the source of second n-type transistor N2.

Switch S[1] is configured to receive first calibration signal CS[1] by an input terminal. Switch S[1] is controlled by first calibration signal CS[1]. In response to the first calibration signal CS[1], switch S[1] is configured to open or close. In some embodiments, if switch S[1] is closed, the third resistor R[1], switch S[1] and fourth resistor R[1] are connected in-series.

Each of the connections for resistor branch RP[1] repeat for each subsequent stage of resistor branch RP[M], where M is a positive integer greater than or equal to 1.

The equivalent resistance value of variable resistor 610 is adjusted based on the number of switches S[1] to S[M] closed. As the equivalent resistance of variable resistor 610 is increased, the gain of amplifier (and an amplitude of the corresponding amplified output signal Vout) is decreased. As the equivalent resistance of variable resistor 610 is decreased, the gain of amplifier (and an amplitude of the corresponding amplified output signal Vout) is increased.

In some embodiments, one or more switches of switches S[1] to S[M] includes an n-type transistor. In some embodiments, one or more switches of switches S[1] to S[M] includes a p-type transistor.

By using amplifier 600 in amplifier GCA[1] to GCA[N] (FIG. 1), GCAs 254 (FIGS. 2 & 4A) or GCA 354 (FIGS. 3 & 4B), data communication system 100, RFI 200, RFI 300, RFI 400 and RFI 400' are able to transfer data with higher precision (lower BERs and higher SNRs) when compared with non-calibrated RFIs.

FIG. 7A is a diagram of a calibration circuit 700 usable in an ADC (FIGS. 2-3 & 5A-5B), in accordance with some embodiments.

Calibration circuit 700 is configured to adjust threshold voltages of corresponding ADC by adjusting a voltage provided by a voltage source. In some embodiments, calibration circuit 700 is an adjustable voltage source. Calibration circuit 700 includes a high voltage source 710 configured to supply a high voltage to resistors 730[1] to 730[n], collectively referred to as resistors 730. Calibration circuit 700 includes a low voltage source 720 configured to supply a low voltage to resistors 730. Calibration circuit 700 is configured to provide threshold voltages Vth[1] to Vth[n], collectively referred to as threshold voltages Vth. Nodes for supplying threshold voltages Vth are located between adjacent resistors 730. For example, a node for supplying threshold voltage Vth[1] is located between resistor 730[1] and resistor 730[2]; and a node for supplying threshold voltage Vth[n] is located between resistor 730[n] and resistor 730[n−1].

Calibration circuit 700 is configured to receive a control signal CS1, e.g., second calibration signal G' (FIGS. 2 & 5A) or second calibration signal GC' (FIGS. 3 & 5B) from preamble receiver 270 (FIGS. 2-3 & 5A-5B). In response to the received control signal CS1, high voltage source 710 is configured to adjust a supplied high voltage or low voltage source 720 is configured to adjust a supplied low voltage. In some embodiments, only one of high voltage source 710 or low voltage source 720 is configured to adjust a supplied voltage, i.e., high voltage or low voltage. In some embodiments, both of high voltage source 710 and low voltage source 720 are configured to adjust the supplied voltages. Increasing the high voltage from high voltage source 710 will increase threshold voltages Vth output by calibration circuit 700. Decreasing the high voltage from high voltage source 710 will decrease threshold voltages Vth output by calibration circuit 700. Increasing the low voltage from low voltage source 720 will decrease threshold voltages Vth output by calibration circuit 700. Decreasing the low voltage from low voltage source 720 will increase threshold voltages Vth output by calibration circuit 700.

In some embodiments, resistors 730 in calibration circuit 700 are non-variable resistors, such that resistors 730 are not actively controllable by control signal CS1. A resistance of resistors 730 is responsive to changes in temperature or other passive variable which impact resistance in resistors. In some embodiments, resistors 730 all have a same resistance. In some embodiments, at least one resistor, e.g., resistor 730[1], has a different resistance from at least one other resistor, e.g., resistor 730[2]. In some embodiments, at least one of resistors 730 is a variable resistor subject to active control based on control signal CS1.

Figure 7B:
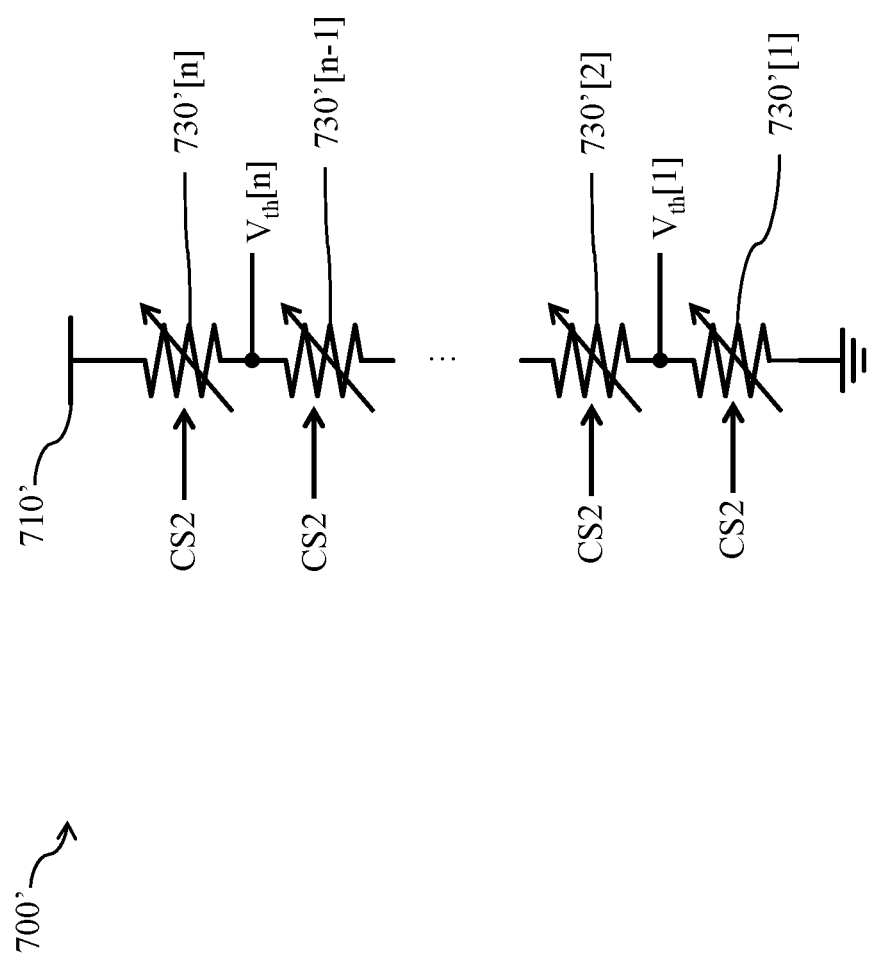
FIG. 7B is a diagram of a calibration circuit usable in an ADC, in accordance with some embodiments.

FIG. 7B is a diagram of a calibration circuit 700' in an ADC in accordance with some embodiments.

Calibration circuit 700' is configured to adjust threshold voltages by adjusting resistance values of resistors 730'. In some embodiments, calibration circuit 700 is an adjustable voltage source. Calibration circuit 700' includes a high voltage source 710' configured to supply a high voltage to resistors 730'[1] to 730'[n], collectively referred to as resistors 730'. Calibration circuit 700' includes resistor 730'[1] connected to ground. Calibration circuit 700' is configured to provide threshold voltages Vth[1] to Vth[n], collectively referred to as threshold voltages Vth. Nodes for supplying threshold voltages Vth are located between adjacent resistors 730'. For example, a node for supplying threshold voltage Vth[1] is located between resistor 730'[1] and resistor 730'[2]; and a node for supplying threshold voltage Vth[n] is located between resistor 730'[n] and resistor 730'[n−1].

Calibration circuit 700' is configured to receive a control signal CS2, e.g., second calibration signal G' (FIGS. 2 & 5A) or second calibration signal GC' (FIGS. 3 & 5B) from preamble receiver 270 (FIGS. 2-3 & 5A-5B). At least one of resistors 730' is a variable resistor subject to active control based on the control signal CS2. In some embodiments, all resistors 730' are variable resistors subject to active control based on the control signal CS2. In some embodiments, each of resistors 730' has a same resistance in response to the control signal CS2. In some embodiments, at least one resistor, e.g., resistor 730'[1], has a different resistance in response to the control signal CS2 from at least one other resistor, e.g., resistor 730'[2]. As the resistance of resistors 730' increases, threshold voltages Vth decrease. As the resistance of resistors 730' decreases, threshold voltages Vth increase. Calibration circuit 700' includes resistors 730' connected in series. In some embodiments, resistors 730' are connected in parallel or resistors 730' include a mixture of series and parallel connections.

Calibration circuit 700' includes a constant high voltage supply 710' which is not subject to active control based on the control signal CS2. In some embodiments, calibration circuit 700' includes a controllable high voltage supply similar to high voltage supply 710 (FIG. 7A). In some embodiments, calibration circuit 700' includes a controllable low voltage supply similar to low voltage supply 720.

Figure 8:
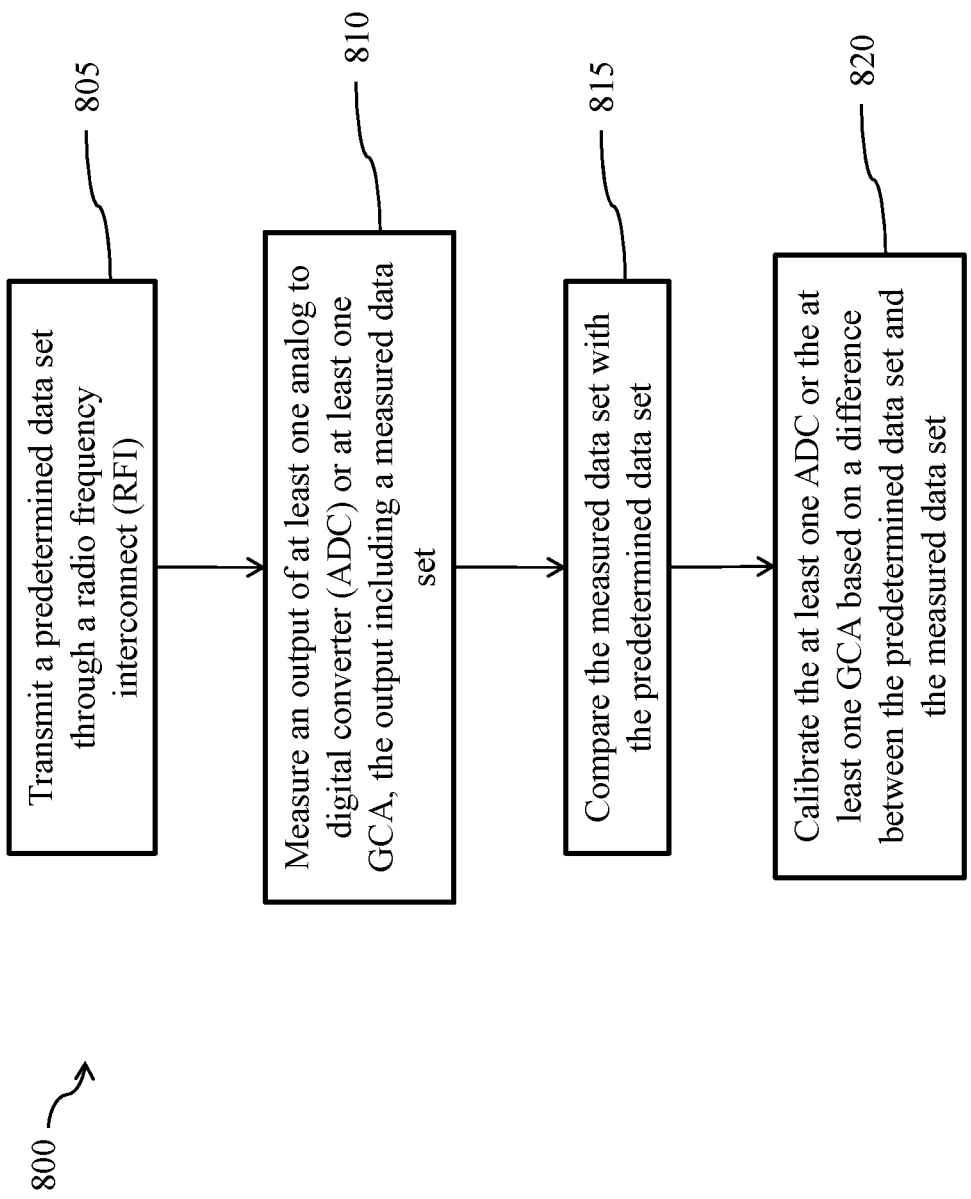
FIG. 8 is a flowchart of a method of calibrating an RFI, in accordance with some embodiments.

FIG. 8 is a flowchart of a method 800 of calibrating an RFI in accordance with some embodiments. In some embodiments, method 800 is usable with data communication system 100 (FIG. 1), RFI 200 (FIG. 2), RFI 300 (FIG. 3), RFI 400 (FIG. 4A), RFI 400' (FIG. 4B), RFI 500 (FIG. 5A), RFI 500' (FIG. 5B) or another suitable RFI. In some embodiments, method 800 is usable with amplifier 600 (FIG. 6), calibration circuit 700 (FIG. 7A), calibration circuit 700' (FIG. 7B), controller 1000 (FIG. 10), or another suitable calibration arrangement.

In operation 805, a predetermined data set, e.g., predetermined data set P (FIG. 2), is transmitted through an RFI, e.g., RFI 200 (FIG. 2), RFI 300 (FIG. 3), RFI 400 (FIG. 4A), RFI 400' (FIG. 4B), RFI 500 (FIG. 5A) or RFI 500' (FIG. 5B). The predetermined data set is transmitted through a channel, e.g., channel 106 or channel 230, from a transmitter side of the RFI to a receiver side of the RFI. In some embodiments, the predetermined data is provided by a preamble transmitter, e.g., preamble transmitter 202. In some embodiments, the predetermined data set is stored in the preamble transmitter. In some embodiments, the predetermined data set is provided by a user. In some embodiments, the predetermined data set is one of a plurality of predetermined data sets.

In operation 810, an output, e.g. data signal DS (FIG. 2 or 5A), data signal DS' (FIG. 4A), data signal DSC (FIG. 3 or 5B) or data signal DSC' (FIG. 4B), of at least one ADC, e.g., ADC 258 (FIG. 2 or 5A) or ADC 358 (FIG. 3 or 5B) or at least one GCA, e.g., GCA 254 (FIG. 4A) or GCA 354 (FIG. 4B), is measured. In some embodiments, the output of the at least one ADC includes a measured data set, e.g., measured data set P' (FIGS. 2-3 & 5A-5B). In some embodiments, the output of the at least one ADC corresponds to the measured data set, e.g., measured data set P' (FIGS. 2-3 & 5A-5B). The at least one ADC, e.g., ADC 258 (FIG. 2) or ADC 358 (FIG. 3, 4B or 5B), or the at least one GCA, e.g., GCA 254 (FIG. 4A) or GCA 354 (FIG. 4B) is part of demodulators, e.g., demodulators DM (FIG. 1) or demodulators 250 (FIG. 2), on the receiver side of the RFI. In some embodiments, the at least one ADC includes a plurality of ADCs. In some embodiments, the at least one GCA includes a plurality of GCAs. In some embodiments, the output of the at least one ADC or GCA is measured by a preamble receiver, e.g., preamble receiver 270.

In some embodiments, operation 810 further includes measuring an output of at least one GCA, e.g., GCA 254 (FIG. 4A) or GCA 354 (FIG. 4B). In some embodiments, the output of the at least one GCA includes a second measured data set, e.g., measured data set P''' (FIGS. 4A-4B). In some embodiments, the output of the at least one GCA corresponds to the measured data set. The at least one GCA, e.g., GCA 254 (FIG. 4A) or GCA 354 (FIG. 4B), is part of demodulators, e.g., demodulators DM (FIG. 1) or demodulators 250 (FIG. 2), on the receiver side of the RFI. In some embodiments, the at least one GCA includes a plurality of GCAs. In some embodiments, the output of the at least one GCA is measured by at least one ADC, e.g., ADCs 258 (FIG. 2) or ADC 358 (FIG. 3), or a preamble receiver, e.g., preamble receiver 270 (FIGS. 4A-4B).

In operation 815, the measured data set, e.g., measured data set P' (FIGS. 2-3 & 5A-5B) or measured data set P''' (FIGS. 4A-4B), is compared with the predetermined data set e.g., predetermined data set P (FIG. 2). In some embodiments, the measured data set is equal to the predetermined data set. In some embodiments, the comparison is performed by the preamble receiver. In some embodiments, the predetermined data set is stored on the preamble receiver.

In operation 820, the at least one ADC or GCA is calibrated responsive to a difference between the measured data set and the predetermined data set. In some embodiments, the preamble receiver, e.g., preamble receiver 270 (FIGS. 2-5B), generates a first set of control signals, e.g., first calibration signal G (FIGS. 2 & 4A), first calibration signal GC (FIG. 3 or 4B) or first calibration signals CS (FIG. 6), responsive to a difference between the measured data set and the predetermined data set. In some embodiments, the preamble receiver, e.g., preamble receiver 270 (FIGS. 2-5B), generates a second set of control signals, second calibration signal G' (FIG. 2 or 5A), second calibration signal GC' (FIG. 3 or 5B), control signal CS1 (FIG. 7A) or control signal CS2 (FIG. 7B), responsive to a difference between the measured data set and the predetermined data set. The first set of control signals or second set of control signals include one or more control signals.

In some embodiments, operation 820 further includes providing the set of first control signals, e.g., first calibration signal G (FIG. 2 or 4A), first calibration signal GC (FIG. 3 or 4B) or first calibration signals CS (FIG. 6), to the at least one GCA in order to calibrate the GCA. In some embodiments, the at least one GCA is calibrated by adjusting a gain of the at least one GCA responsive to the set of first control signals. In some embodiments, the at least one GCA is calibrated by adjusting a resistance of at least one resistor, e.g., resistor R2, R3 (FIG. 6), in the GCA responsive to the set of first control signals, control signal CS (FIG. 6). In some embodiments, the amount of difference between the measured data set and the predetermined data set is directly proportional to an amount of gain of the at least one GCA that is adjusted.

In some embodiments, operation 820 further includes providing the set of second control signals, second calibration signal G' (FIG. 2 or 5A), second calibration signal GC' (FIG. 3 or 5B), control signal CS1 (FIG. 7A) or control signal CS2 (FIG. 7B), to the at least one ADC in order to calibrate the ADC. In some embodiments, the at least one ADC is calibrated by adjusting a threshold voltage of the at least one ADC responsive to the set of second control signals. In some embodiments, the threshold voltage of at least one ADC is adjusted by adjusting at least one voltage source, e.g., high voltage source 710 (FIG. 7A) or low voltage source 720, of the at least one ADC responsive to the set of second control signals. In some embodiments, the threshold voltage of at least one ADC is adjusted by adjusting at least one resistance of at least one resistor, e.g., resistors 730 (FIG. 7A) or resistors 730' (FIG. 7B), in the ADC responsive to the set of second control signals. In some embodiments, the threshold voltage of at least one ADC is adjusted by adjusting at least one voltage source, e.g., high voltage source 710 (FIG. 7A) or low voltage source 720, of the at least one ADC responsive to the set of second control signals and adjusting at least one resistance of at least one resistor, e.g., resistors 730 (FIG. 7A) or resistors 730' (FIG. 7B), in the ADC responsive to the set of second control signals.

Following method 800, the RFI begins transferring data other than the predetermined data set. In some embodiments, method 800 is repeated multiple times prior to the RFI transferring data other than the predetermined data set. In some embodiments, method 800 is repeated intermittently by the RFI. In some embodiments, a period for repeating method 800 is determined based on an amount of data transferred by the RFI. In some embodiments, a period for repeating method 800 is determined based on a time duration. In some embodiments, method 800 is repeated in response to a user input. In some embodiments, method 800 is repeated for each packet of data transmitted by the RFI, e.g., RFI 200 (FIG. 2), RFI 300 (FIG. 3), RFI 400 (FIG. 4A), RFI 400' (FIG. 4B), RFI 500 (FIG. 5A) or RFI 500' (FIG. 5B), of the data communication system, e.g., data communication system 100 (FIG. 1).

It is understood that additional operations may be performed before, during, and/or after the method 800 depicted in FIG. 8, and that some other processes may only be briefly described herein.

Figure 9:
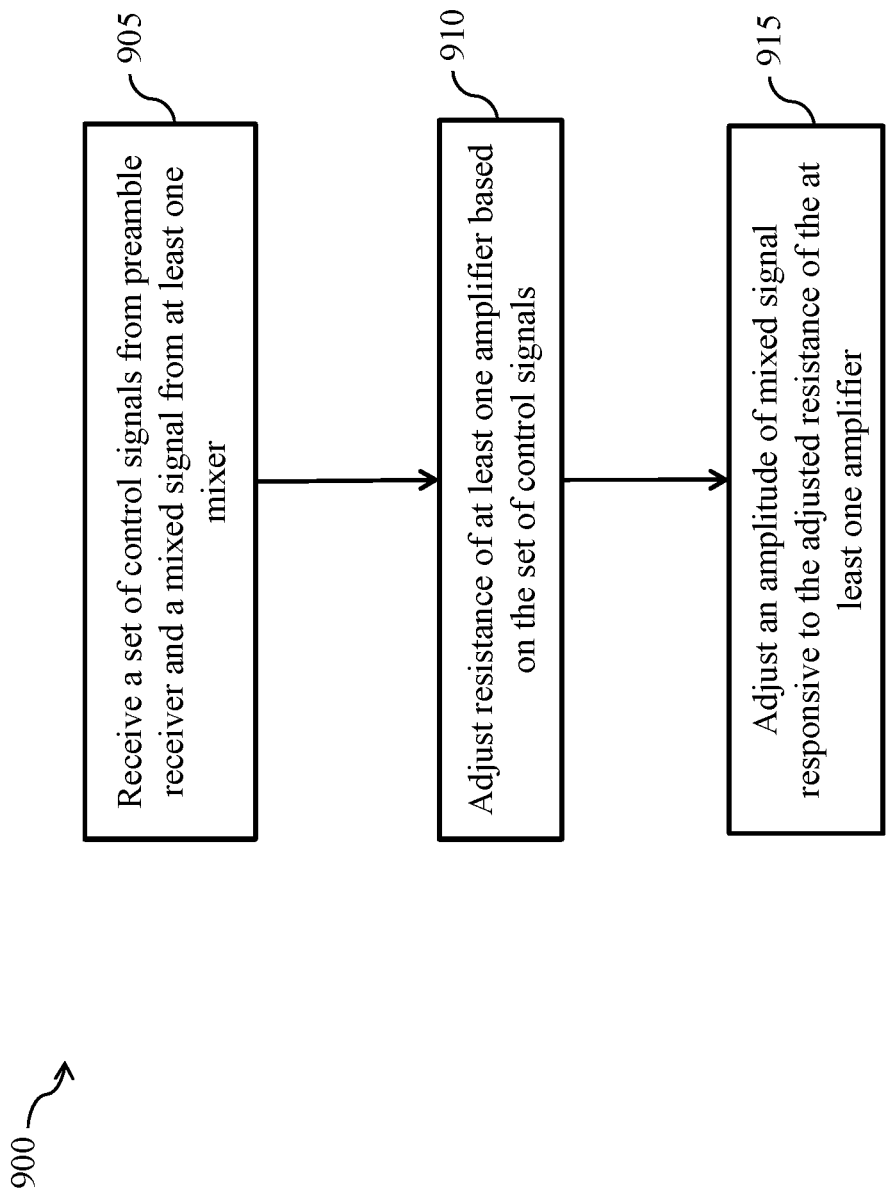
FIG. 9 is a flowchart of a method of calibrating a GCA, in accordance with some embodiments.

FIG. 9 is a flowchart of a method 900 of calibrating a GCA in accordance with some embodiments. In some embodiments, method 900 is usable with data communication system 100 (FIG. 1), RFI 200 (FIG. 2), RFI 300 (FIG. 3), RFI 400 (FIG. 4A), RFI 400' (FIG. 4B), RFI 500 (FIG. 5A) or RFI 500' (FIG. 5B) or another suitable RFI. In some embodiments, method 900 is usable with amplifier 600 (FIG. 6), controller 1000 (FIG. 10), or another suitable calibration arrangement. Method 900 is an embodiment of operation 820 (FIG. 8) with similar elements.

In operation 905, a set of control signals, e.g., calibration signal G (FIG. 2 or 4A), calibration signal GC (FIG. 3 or 4B) or calibration signal CS (FIG. 6), and a mixed signal, e.g., mixed signal MO (FIG. 1), are received. The set of control signals is received from preamble receiver, e.g., preamble receiver 270 (FIGS. 2-5B). The mixed signal is received from at least one mixer, e.g., mixer MIX[1] to MIX[N] (FIG. 1) or mixer 252 (FIGS. 2-3). In some embodiments, the mixed signal is received from each mixer, e.g., mixers 252[N] to 252[N] (FIG. 3).

In operation 910, a resistance of at least one resistor, e.g., resistor R2, R3 (FIG. 6), of at least one GCA, e.g., GCA 254 (FIG. 2 or 4A), GCA 354 (FIG. 3 or 4B) or amplifier 600 (FIG. 6), is adjusted responsive to the set of control signals.

In operation 915, an amplitude of the mixed signal is adjusted responsive to the adjusted resistance of the amplifier. In some embodiments, adjusting an amplitude of the mixed signal corresponds to adjusting a gain of the at least one amplifier. In some embodiments, operations 910 and 915 correspond to adjusting the gain of the at least one GCA.

It is understood that additional operations may be performed before, during, and/or after the method 900 depicted in FIG. 9, and that some other processes may only be briefly described herein.

Figure 10:
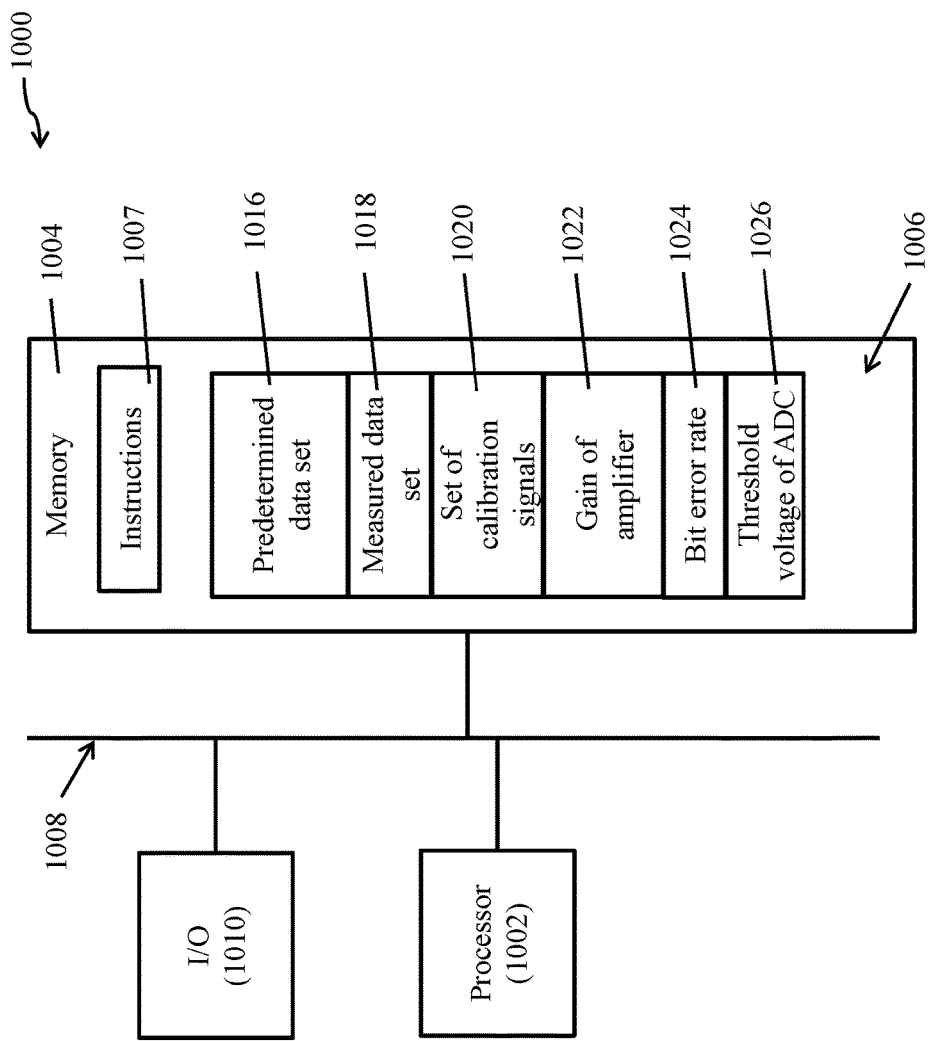
FIG. 10 is a block diagram of a controller usable in the RFI in FIGS. 2-4B, in accordance with some embodiments.

FIG. 10 is a block diagram of a controller 1000 usable in the RFI 200 in FIG. 2, in accordance with some embodiments. In some embodiments, the controller 1000 is an embodiment of the preamble receiver 270 shown in RFI 200 (FIG. 2), RFI 300 (FIG. 3), RFI 400 (FIG. 4A), RFI 400' (FIG. 4B), RFI 500 (FIG. 5A) or RFI 500' (FIG. 5B). In some embodiments, the controller 1000 is an embodiment of the preamble transmitter 202 shown in RFI 200 (FIG. 2). In some embodiments, the controller 1000 is a computing device which implements at least a portion of method 800 of FIG. 8 or method 900 of FIG. 9 in accordance with one or more embodiments. Controller 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with GCAs (e.g., GCA 254 or GCA 354) for adjusting the corresponding gain of GCAs (e.g., GCA 254 or GCA 354) or ADCs (e.g., ADC 258 or ADC 358) for adjusting the threshold voltage of corresponding ADCs (e.g., ADC 258 or ADC 358). The processor 1002 is electrically coupled to the computer readable storage medium 1004 by a bus 1008. The processor 1002 is also electrically coupled to an I/O interface 1010 by bus 1008. The processor 1002 is configured to execute the computer program code 1006 encoded in the computer readable storage medium 1004 in order to cause controller 1000 to be usable for performing a portion or all of the operations as described e.g., in method 800 and 900.

In one or more embodiments, the processor 1002 is a central processing unit (CPU), a multi-processor, a distributed processing system, an application specific integrated circuit (ASIC), and/or a suitable processing unit.

In one or more embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 1004 includes a compact disk-read only memory (CD-ROM), a compact disk-read/write (CD-R/W), and/or a digital video disc (DVD).

In one or more embodiments, the storage medium 1004 stores the computer program code 1006 configured to cause controller 1000 to perform method 800 or 900. In one or more embodiments, the storage medium 1004 also stores information needed for performing method 800 or 900 as well as information generated during performing method 800 or 900, such as predetermined data set 1016, measured data set 1018, set of calibration signals 1020, gain of amplifier 1022, bit error rate 1024, threshold voltage of ADC 1026 and/or a set of executable instructions to perform the operation of method 800 or 900.

In some embodiments, predetermined data set 1016 includes predetermined data set P (FIG. 2). In some embodiments, measured data set 1018 includes data signal DS (FIG. 2 or 5A), data signal DSC (FIG. 3 or 5B), data signal DS' (FIG. 4A) or data signal DSC' (FIG. 4B). In some embodiments, set of calibration signals 1020 includes first calibration signals G (FIG. 2 or 4A), first calibration signals GC (FIG. 3 or 4B), first calibration signals G' (FIG. 5A), first calibration signals GC' (FIG. 5B), first calibration signals CS (FIG. 6), control signal CS1 (FIG. 7A), control signal CS2 (FIG. 7B). In some embodiments, gain of amplifier 1022 includes gain of GCAs 254 or GCA 354 (FIG. 1, FIG. 2, FIG. 3 or FIGS. 4A-4B). In some embodiments, bit error rate 1024 includes BER (FIG. 2). In some embodiments, threshold voltage of ADC 1026 includes threshold voltages of ADCs 258 or ADC 358 (FIG. 1, FIG. 2, FIG. 3 or FIGS. 5A-5B). In some embodiments, bit error rate 1024 includes BER (FIG. 2).

In one or more embodiments, the storage medium 1004 stores instructions 1007 for interfacing with external machines. The instructions 1007 enable processor 1002 to generate instructions readable by the external machines to effectively implement method 800 or 900 during a calibration of an RFI.

Controller 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002. Controller 1000 is configured to receive information related to a UI through I/O interface 1010. The information is transferred to processor 1002 by bus 1008 to set a bit error rate of the communication system (RFI 200) and a corresponding predetermined data set 1016. The UI is then stored in computer readable medium 1004 as a request to update the bit error rate 1024 or the predetermined data set 1016. Controller 1000 is configured to receive information related to the predetermined data set through I/O interface 1010. The information is stored in computer readable medium 1004 as predetermined data set 1016. Controller 1000 is configured to receive information related to a measured data set through I/O interface 1010. The information is stored in computer readable medium 1004 as measured data set 1018. Controller 1000 is configured to receive information related to a set of calibration signals through I/O interface 1010. The information is stored in computer readable medium 1004 as set of calibration signals 1020. Controller 1000 is configured to receive information related to a gain of an amplifier through I/O interface 1010. The information is stored in computer readable medium 1004 as gain of amplifier 1022. Controller 1000 is configured to receive information related to a BER of communication system 100 through I/O interface 1010. The information is stored in computer readable medium 1004 as bit error rate 1024. Controller 1000 is configured to receive information related to a threshold voltage of an ADC through I/O interface 1010. The information is stored in computer readable medium 1004 as threshold voltage of ADC 1026.

One aspect of this description relates to a radio frequency interconnect (RFI). The RFI includes a transmitter side connected to a first end of a channel, a receiver side connected to a second end of the channel opposite the first end and a calibration system. The receiver side includes at least one of the following configurations: (a) at least one gain control amplifier (GCA); or (b) at least one analog to digital converter (ADC). The calibration system is configured to transmit a predetermined data set through the channel, receive an output from the at least one ADC or the at least one GCA, and calibrate the at least one ADC or the at least one GCA based on a measured data set. The output includes the measured data set based on the predetermined data set transmitted through channel.

Another aspect of this description relates to a radio frequency interconnect (RFI). The RFI includes a preamble transmitter configured to output a predetermined data set, a plurality of modulators configured to receive the predetermined data set and output a plurality of modulated signals, a channel configured to carry the plurality of modulated signals, a plurality of demodulators configured to receive the plurality of modulated signals from the channel, and a preamble receiver. Each demodulator of the plurality of demodulators comprises a mixer configured to receive a corresponding modulated signal of the plurality of modulated signals, and to output a mixed signal; a gain control amplifier (GCA) configured to receive the mixed signal and to output an amplified signal; and an analog to digital converter (ADC) configured to receive the amplified signal and to output a digital signal. The preamble receiver is configured to receive the digital signal from the ADC of each demodulator of the plurality of demodulators, and to supply a first control signal to the GCA of each demodulator of the plurality of demodulators and a second control signal to the ADC of each demodulator of the plurality of demodulators.

Still another aspect of this description relates to a method of calibrating a radio frequency interconnect (RFI). The method includes transmitting a predetermined data set through a channel of the RFI, measuring an output of at least one analog to digital converter (ADC) or at least one gain control amplifier (GCA), the output including a measured data set; comparing the measured data set with the predetermined data set; and calibrating the at least one ADC or at least one GCA based on the comparison.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A radio frequency interconnect (RFI) comprising:
   a transmitter side connected to a first end of a channel;
   a receiver side connected to a second end of the channel opposite the first end, wherein the receiver side comprises at least one gain control amplifier (GCA) and at least one analog to digital converter (ADC); and
   a calibration system, wherein the calibration system is configured to:
      transmit a predetermined data set through the channel;
      receive an output from the at least one ADC, the output including a measured data set; and
      calibrate the at least one ADC and the at least one GCA based on the measured data set.

2. The RFI of claim 1, wherein the calibration system comprises:
   a preamble transmitter in the transmitter side; and
   a preamble receiver in the receiver side.

3. The RFI of claim 2, wherein the preamble receiver is configured to:
   receive the measured data set from the at least one ADC;
   compare the measured data set with the predetermined data set; and
   provide a first control signal to the at least one ADC.

4. The RFI of claim 3, wherein the at least one ADC comprises an adjustable voltage source configured to adjust a first voltage supplied to a plurality of resistors or a second voltage supplied to the plurality of resistors, the adjustable voltage source being responsive to the first control signal.

5. The RFI of claim 4, wherein the at least one ADC further comprises at least one variable resistor configured to adjust a threshold voltage of the ADC, the at least one variable resistor being responsive to the first control signal.

6. The RFI of claim 2, wherein the preamble receiver is configured to:
   receive the measured data set from the at least one ADC;
   compare the measured data set with the predetermined data set; and
   provide a first control signal to the at least one GCA.

7. The RFI of claim 6, wherein the at least one GCA comprises a variable resistor configured to adjust a gain of the GCA responsive to the first control signal.

8. The RFI of claim 2, wherein both the preamble transmitter and the preamble receiver are configured to store the predetermined data set.

9. The RFI of claim 1, wherein the channel corresponds to a transmission line configured to carry a pair of differential signals.

10. The RFI of claim 1, wherein the measured data set and the predetermined data set both correspond to a preamble portion of a packet of data.

11. A radio frequency interconnect (RFI) comprising:
    a preamble transmitter configured to output a predetermined data set;
    a plurality of modulators configured to receive the predetermined data set and output a plurality of modulated signals;
    a channel configured to carry the plurality of modulated signals;
    a plurality of demodulators configured to receive the plurality of modulated signals from the channel, wherein each demodulator of the plurality of demodulators comprises:

a mixer configured to receive a corresponding modulated signal of the plurality of modulated signals, and to output a mixed signal;

a gain control amplifier (GCA) configured to receive the mixed signal and to output an amplified signal; and an analog to digital converter (ADC) configured to receive the amplified signal and to output a digital signal; and a preamble receiver configured to receive the digital signal from the ADC of each demodulator of the plurality of demodulators, and to supply a first control signal to the GCA of each demodulator of the plurality of demodulators and a second control signal to the ADC of each demodulator of the plurality of demodulators.

12. The RFI of claim 11, wherein the GCA of each demodulator of the plurality of demodulators comprises a variable resistor configured to adjust a gain of the corresponding GCA responsive to the first control signal.

13. The RFI of claim 11, wherein the GCA of each demodulator of the plurality of demodulators comprises:

a variable resistor configured to adjust a gain of the GCA responsive to the first control signal;

a current source connected between the variable resistor and a first reference voltage;

a first transistor having a first terminal, a second terminal and a third terminal, the first terminal of the first transistor configured to receive a first input signal, the second terminal of the first transistor connected to the variable resistor and the current source;

a first resistor connected between the third terminal of the first transistor and a second reference voltage;

a second transistor having a first terminal, a second terminal and a third terminal, the first terminal of the second transistor configured to receive a second input signal, the second terminal of the second transistor connected to the variable resistor and the current source; and a second resistor connected between the third terminal of the second transistor and the second reference voltage.

14. The RFI of claim 13, wherein the variable resistor comprises:

a third resistor;

a first switch having a first terminal, a second terminal and a third terminal, the first terminal of the first switch configured to receive a first portion of the first control signal, the first switch configured to open or close responsive to the first portion of the first control signal; and a fourth resistor connected between the third terminal of the first switch and the second terminal of the second transistor, the third resistor connected between the second terminal of the first switch and the second terminal of the first transistor.

15. The RFI of claim 14, wherein the variable resistor further comprises:

a fifth resistor;

a second switch having a first terminal, a second terminal and a third terminal, the first terminal of the second switch configured to receive a second portion of the first control signal, the second switch configured to open or close responsive to the second portion of the first control signal; and a sixth resistor connected between the third terminal of the second switch and the second terminal of the second transistor, the fifth resistor connected between the second terminal of the second switch and the second terminal of the first transistor.

16. A method of calibrating a radio frequency interconnect (RFI), the method comprising:

transmitting a predetermined data set through a channel of the RFI;

measuring an output of at least one analog to digital converter (ADC), the output including a measured data set;

comparing the measured data set with the predetermined data set; and calibrating the at least one ADC and at least one gain control amplifier (GCA) based on the comparison.

17. The method of claim 16, wherein calibrating the at least one ADC comprises:

generating a set of control signals based on a difference between the measured data set and the predetermined data set; and adjusting a threshold voltage of the at least one ADC responsive to the set of control signals.

18. The method of claim 17, wherein adjusting the threshold voltage of the at least one ADC comprises:

adjusting a voltage source of the at least one ADC responsive to the set of control signals; or adjusting a resistance of the at least one ADC responsive to the set of control signals.

19. The method of claim 16, wherein calibrating the at least one GCA comprises:

generating a set of control signals based on a difference between the measured data set and the predetermined data set;

receiving the set of control signals from a preamble receiver and a mixed signal from a mixer, the set of control signals are generated responsive to the difference between the measured data set and the predetermined data set; and adjusting a gain of the at least one GCA responsive to the set of control signals.

20. The method of claim 19, wherein adjusting the gain of the at least one GCA comprises:

adjusting a resistance of the at least one GCA responsive to the set of control signals; and adjusting an amplitude of the mixed signal responsive to the adjusted resistance of the at least one GCA.

* * * * *